(12) United States Patent
McPheron et al.

(10) Patent No.: US 7,943,028 B2
(45) Date of Patent: May 17, 2011

(54) METHOD FOR COATING OBJECTS

(75) Inventors: Douglas A. McPheron, Mars, PA (US);
Gary R. Orosz, Valencia, PA (US);
Catharine A. Palmer, Zelienople, PA (US); John H. Martin, Pittsburgh, PA (US); Lawrence T. Kirby, Allison Park, PA (US); Robin M. Peffer, Valentia, PA (US); Nathan L. Goodnow, Harmony, PA (US); Paul J. Kaufman, Parker, PA (US); William H. Rodgers, Butler, PA (US); Raymond J. Kaufman, Parker, PA (US); Daryl L. Vettori, Saxonburg, PA (US); Richard D. Pollick, Sarver, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1070 days.

(21) Appl. No.: 10/918,720

(22) Filed: Aug. 13, 2004

(65) Prior Publication Data
US 2006/0032748 A1 Feb. 16, 2006

(51) Int. Cl.
*C25D 1/12* (2006.01)
(52) U.S. Cl. ........ 204/471; 204/512; 204/622; 204/623; 198/463.2
(58) Field of Classification Search .................. 204/471, 204/512, 622, 623, 203, 624; 198/463.2
See application file for complete search history.

(56) References Cited

U.S. PATENT DOCUMENTS

| | | | |
|---|---|---|---|
| 1,168,281 A | 1/1916 | Buch | |
| 1,908,830 A | 5/1933 | Edison | |
| 2,011,328 A | 8/1935 | Tuttle | |
| 2,215,144 A | 9/1940 | Clayton et al. | |
| 2,215,166 A | 9/1940 | Sumner et al. | |
| 2,909,271 A | 10/1959 | Taylor | |
| 2,925,165 A | 2/1960 | Rake | |
| 3,049,482 A | 8/1962 | Dolan | |
| 3,094,477 A * | 6/1963 | Jackson et al. | 204/623 |
| 3,228,357 A | 1/1966 | Bruschke et al. | |
| 3,539,489 A | 11/1970 | Ness | |
| 3,616,392 A | 10/1971 | Haney | |
| 3,635,149 A | 1/1972 | Smith et al. | |
| 3,674,670 A | 7/1972 | Erikson et al. | |
| 3,694,336 A | 9/1972 | Fiala | |
| 3,716,468 A | 2/1973 | Chiappe | |
| 3,728,247 A | 4/1973 | Haney | |
| 3,815,617 A | 6/1974 | Faust | |
| 3,830,716 A | 8/1974 | Haney et al. | |
| 3,830,902 A | 8/1974 | Barnes | |
| 3,843,503 A | 10/1974 | Wagner | |

(Continued)

FOREIGN PATENT DOCUMENTS

EP 382283 8/1990

(Continued)

*Primary Examiner* — Alexa D Neckel
*Assistant Examiner* — Xiuyu Tai
(74) *Attorney, Agent, or Firm* — Donald R. Palladino

(57) ABSTRACT

A method for the electrophoretic application of a polymeric coating to an object having an elongate portion on a continuous belt, comprising the steps of positioning the object to engage a retaining member, the retaining member engaging the continuous belt such that a retaining portion on the retaining member releasably retains the elongate portion of the object to the belt; conveying the continuous belt with a drive mechanism; and coating the object on the continuous belt.

40 Claims, 20 Drawing Sheets

U.S. PATENT DOCUMENTS

| | | | |
|---|---|---|---|
| 3,849,277 A * | 11/1974 | Miyata et al. | 204/202 |
| 3,879,277 A | 4/1975 | Guzzetta et al. | |
| 3,898,151 A | 8/1975 | Nessar | |
| 3,923,623 A | 12/1975 | Brown et al. | |
| 3,945,901 A | 3/1976 | Nessar | |
| 3,997,418 A | 12/1976 | Buse et al. | |
| 4,005,000 A | 1/1977 | Kraska | 204/181 |
| 4,107,016 A * | 8/1978 | Brower et al. | 204/479 |
| 4,119,522 A | 10/1978 | Brower, Jr. et al. | |
| 4,154,194 A * | 5/1979 | Geiger et al. | 118/401 |
| 4,165,242 A | 8/1979 | Kelly et al. | |
| 4,189,845 A | 2/1980 | Candor | |
| 4,208,261 A | 6/1980 | Todoroki et al. | |
| 4,208,262 A | 6/1980 | Kubo et al. | |
| 4,217,918 A | 8/1980 | Faunce et al. | |
| 4,529,492 A | 7/1985 | Buchholz et al. | |
| 4,586,236 A | 5/1986 | Jones | |
| 4,663,014 A | 5/1987 | Bassett et al. | |
| 4,693,801 A | 9/1987 | Bolte | |
| 4,799,589 A | 1/1989 | Peleckis | 206/330 |
| 4,812,211 A | 3/1989 | Sakai | |
| 4,832,183 A | 5/1989 | Lapeyre | |
| 4,889,227 A | 12/1989 | Toncelli | |
| 5,025,750 A | 6/1991 | Sessa et al. | |
| 5,087,331 A | 2/1992 | Röll et al. | |
| 5,114,751 A | 5/1992 | Ahmed et al. | |
| 5,164,056 A | 11/1992 | Loeck | |
| 5,169,621 A | 12/1992 | DiMaio et al. | |
| 5,223,104 A | 6/1993 | Grassi et al. | |
| 5,264,096 A | 11/1993 | Jorgens | |
| 5,306,346 A | 4/1994 | DiMaio et al. | |
| 5,317,272 A | 5/1994 | Jorgens | |
| 5,348,634 A | 9/1994 | Matsuo et al. | |
| 5,379,880 A | 1/1995 | Stone et al. | |
| 5,494,754 A | 2/1996 | Schubert et al. | |
| 5,562,810 A | 10/1996 | Urquhart | |
| 5,586,618 A | 12/1996 | Francis | |
| 5,624,540 A | 4/1997 | Jörgens | |
| 5,782,337 A * | 7/1998 | Langland | 198/803.1 |
| 5,810,987 A * | 9/1998 | Opitz | 204/512 |
| 6,132,570 A | 10/2000 | Akram et al. | |
| 6,162,339 A | 12/2000 | Salman et al. | |
| 6,269,935 B1 * | 8/2001 | McCullen et al. | 198/470.1 |
| 6,368,719 B1 | 4/2002 | Siever et al. | |
| 6,554,988 B1 | 4/2003 | Dahms et al. | |
| 2003/0052009 A1 | 3/2003 | Case et al. | |

FOREIGN PATENT DOCUMENTS

GB  2021500 A  12/1979

* cited by examiner

METHOD FOR COATING OBJECTS

FIELD OF THE INVENTION

The present invention relates to a method for coating objects, and, more particularly, relates to a continuous method for coating objects.

BACKGROUND & DISCUSSION

In the manufacture of products and components, various small parts, such as bolts, nuts, washers, screws, and the like, are employed that mainly serve a functional role in the final assembly. In order to prepare these parts for final assembly, a coating material is typically deposited on at least portions of the part to cover the substrate. Of particular importance is the coating of Class A surfaces (i.e. those surfaces that are readily visible in the final assembly when the part is installed), that provide a finished appearance to the part and/or provide protection to the underlying substrate from damaging effects as a result of use, wear, and/or environmental conditions. For example, if the small part is a combination of a bolt and an integral washer, particular attention is directed to depositing a coating on the head of the bolt and the visible portions of the washer.

Because of the substantial number of small parts employed in the manufacturing industry, various coating techniques have been employed for depositing material on these parts at high speeds. In one known prior art coating system, small parts are spread and loosely placed on a large conveyor belt for high-speed coating, particularly electrophoretic coating. While on the conveyor belt, the loosely placed parts are affected by forces from the belt, such as forces due to inertia, vibration, and the like, that allow the individual parts to randomly move on the belt. In many instances, the individual parts come in close proximity to or engage each other while passing through the coating system such that, when the coating is applied over the parts and dried or cured, two or more parts may adhere together at the point of engagement (known as a "touch point"). These coated parts must then be separated from each other with some degree of force that, typically, results in the removal of at least some of the coating from the part at or around the touch point. Touch points may also be formed when a part touches the side of the conveyor. Additionally, even if no contact is made between objects or the sides of the conveyor, contact is still present between the object and the conveyor belt that is resting on, and a touch point is present at each point of contact with the belt. At the very least, the touch point provides an unsightly blemish on the finished product. When the part is formed from a corrosive material, the touch point, in addition to its reduced appearance, has a substantially greater chance of developing premature signs of corrosion following assembly. Because the objects are randomly positioned on the belt, it is difficult to predict the location of the touch points prior to coating.

In some circumstances, due to aesthetic standards and/or quality requirements for the part, customers may require that certain areas of the part, such as the Class A surfaces, contain no touch points. For example, when the part is a bolt, it may be required that the Class A surfaces of the bolt, such as the head of the bolt, contain no touch points, while non-Class A surfaces, such as the shaft and threads of the bolt, may contain touch points.

In the random coating process described above, because the small parts move randomly on the conveyor belt, it has been difficult to control how and where touch points may occur, or to limit the touch points to non-Class A surfaces. Accordingly, in order to meet quality standards, the supplier employing this coating technique may find it necessary to incur time and cost consuming efforts to sort and scrap non-conforming parts.

In order to address some of the above-described problems in the prior art, it is known to provide a single-run, disposable belt that employs break-away pins that temporarily lock the small parts to the belt while the parts travel through the coating system. After the parts are coated and dried or cured, the parts are removed from the belt by snapping each part and the respective break-away pin from the belt. The used pins and belt are disposed of, and new pins and a new belt are employed for each subsequent coating run. Although this system provides some degree of consistency to the coating process, and controls, to some degree, the areas where the touch points appear, this system is relatively inefficient, in that it requires a high degree of operator maintenance for loading and unloading the belt, belt exchange, and waste management.

Accordingly, it would be a welcome addition in the art to provide an apparatus and process that can materially reduce or avoid the shortcomings in the prior art, improve coating efficiency, while providing a coated object that meets or exceeds stringent functional and aesthetic quality requirements.

SUMMARY OF THE INVENTION

The present invention provides a method for the electrophoretic application of a polymeric coating to an object, having an elongate portion on a continuous belt. The method comprises positioning the object to engage a retaining member, the retaining member engaging the continuous belt such that a retaining portion on the retaining member releasably retains the elongate portion of the object to the belt; conveying the continuous belt with a drive mechanism; and electrophoretically coating the object on the continuous belt.

In another embodiment, the present invention provides a method for the electrophoretic application of a polymeric coating to an object having an elongate portion on a continuous belt. The method comprises feeding the object onto the continuous belt by a feeding mechanism; positioning the object to engage a retaining member, the retaining member engaging the continuous belt such that a retaining portion on the retaining member releasably retains the elongate portion of the object to the belt; conveying the continuous belt with a drive mechanism; electrophoretically coating the object on the continuous belt; drying the coating on the object; and releasing the object from the retaining member.

The present invention also provides a method for the electrophoretic application of a polymeric coating to an object having an elongate portion on a continuous belt. The method comprises the steps of: feeding the object onto the continuous belt by a feeding mechanism; positioning the elongate portion of the object between a retaining member and a guide member engaging the continuous belt, such that the object is releasably retained therebetween, the retaining member and the guide member positioned to form a retaining unit on the belt, the guide member having a base portion that engages the continuous belt and including a sloping portion having a decreasing height as measured from its base, the retaining member having an arm portion to releasably retain the object between the guide member and the retaining member; conveying the continuous belt with a drive mechanism; electrophoretically coating the object on the continuous belt; drying the object; and releasing the object from the retaining unit.

It should be understood that this invention is not limited to the embodiments disclosed in this summary, but it is intended to cover modifications that are within the spirit and scope of the invention, as defined by the claims.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

Figure 1:
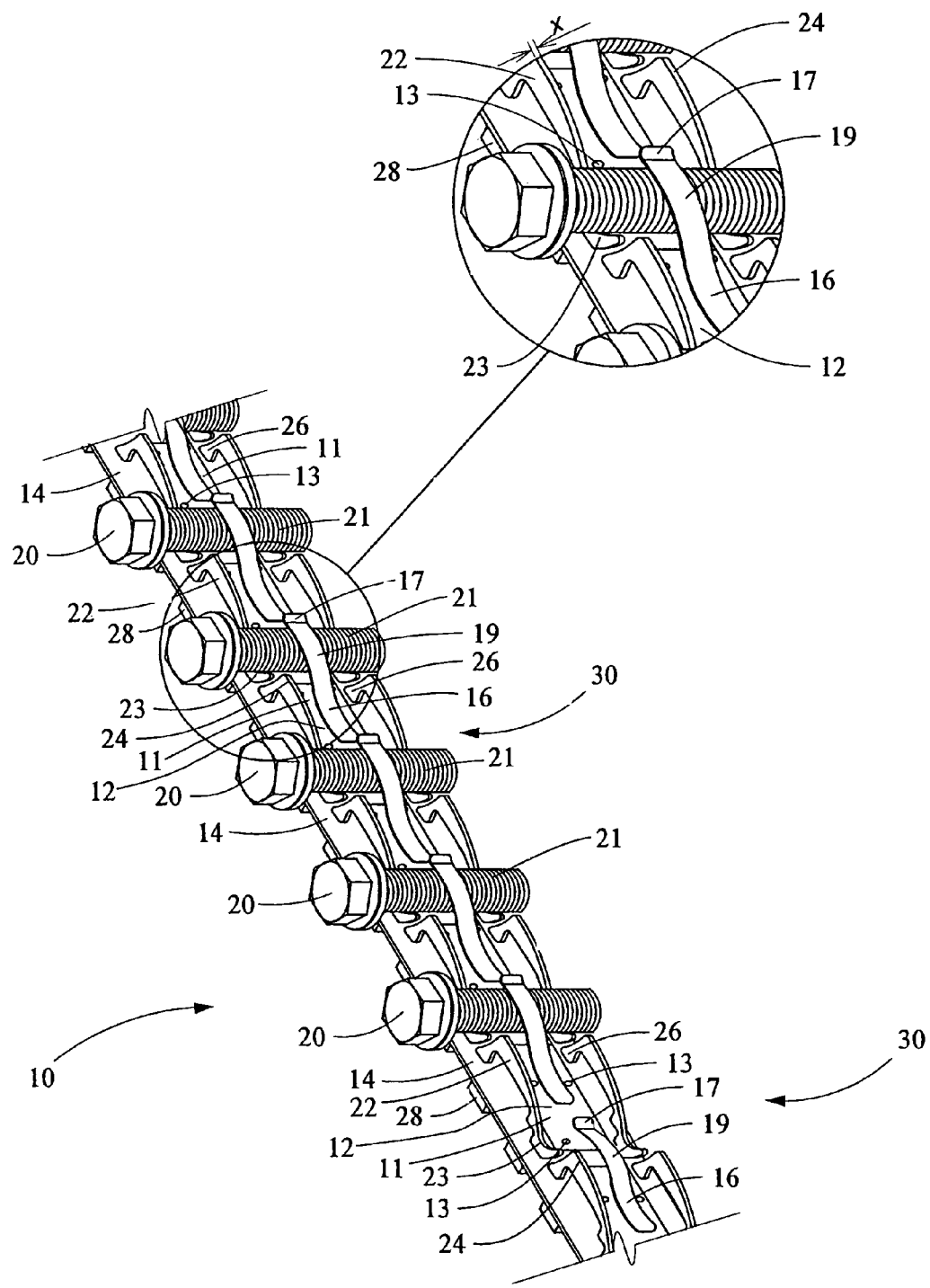
FIG. 1 is a perspective view of one embodiment of the continuous belt of the present invention, releasably retaining an object in the form of a threaded bolt and washer.
Figure 3:
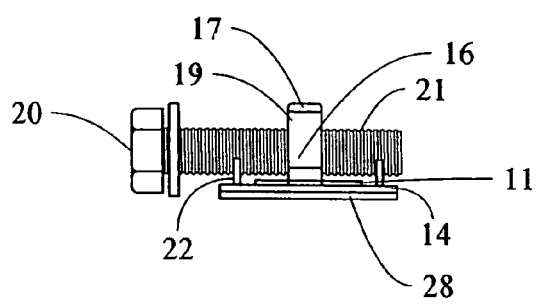
FIG. 3 is a side elevation view of the continuous belt, as illustrated in FIG. 1.
Figure 2:
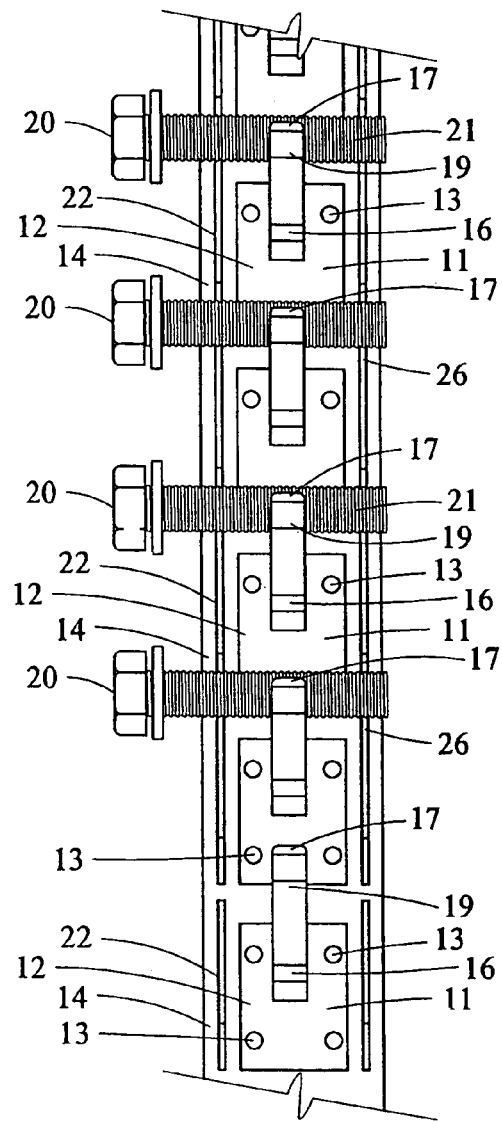
FIG. 2 is a top plan view of the continuous belt, as illustrated in FIG. 1.

It is to be understood that the Figures and descriptions of the present invention have been simplified to illustrate elements that are relevant for a clear understanding of the present invention, while eliminating, for purposes of clarity, other elements. Those of ordinary skill in the art will recognize that other elements may be desirable in order to implement the present invention. However, because such elements are well known in the art, and because they do not facilitate a better understanding of the present invention, a discussion of such elements is not provided herein.

In the present Detailed Description of the Invention, the invention will be illustrated in the form of an apparatus for depositing a coating on an object having a particular configuration. To the extent that this configuration gives size and structural shape to the object, it should be understood that the invention is not limited to embodiment in such form and may have application in whatever size, shape, and configuration of objects desired to be coated. Thus, while the present invention is capable of embodiment in many different forms, this detailed description and the accompanying drawings disclose only specific forms as examples of the invention. Those having ordinary skill in the relevant art will be able to adapt the invention to application in other forms not specifically presented herein based upon the present description. For example, in the present Detailed Description of the Invention, the invention will be illustrated as a method and apparatus for coating on an object, such as, for example, a bolt, having an elongate portion that is cylindrically shaped, such as a bolt shaft. It should be understood that the detailed description in this form is only illustrative of the present invention, and that the present invention may be employed with objects of other shapes and configurations that are not specifically described herein.

Also, the present invention and devices to which it may be attached may be described and/or illustrated herein in a normal operating position, and terms such as upper, lower, front, back, horizontal, proximal, distal, etc., may be used with reference to the normal operating position of the referenced device or element. It will be understood, however, that the apparatus of the invention may be manufactured, stored, transported, used, and sold in orientations other than those described and/or illustrated herein.

Other than in the operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

The present invention is directed to a method and apparatus for depositing a coating on an object, typically via electrophoretic coating techniques. As used herein, the phrase "deposited on" a substrate means deposited or provided above or over but not necessarily adjacent to the surface of the substrate. For example, a coating can be deposited directly on the substrate or one or more other coatings can be applied therebetween.

As used herein, the term "object" is meant to include all articles, particularly those having an elongate portion, that may be coated. The term "object" is meant to include small parts, such as fasteners, nuts, bolts, screws, pins, nails, clips, buttons, and small size stampings, castings, wire goods, hardware, and the like.

As used herein, the term "elongate portion" is defined as a lateral sidewall of the object that extends, either directly or indirectly, from an end of the object. For example, where the object is a bolt, the elongate portion may be the shaft of the bolt that extends from the bolt head. It is contemplated that an object may have more than one elongate portion.

For illustration purposes only, and without intending to limit the scope of the present invention, the object and elongate portion are illustrated as a bolt and bolt shaft, respectively.

As set forth in detail below, the Figures illustrate a continuous conveyor belt apparatus that can be used to convey an object, such as a bolt, from a point of origin to a destination point or in a continuous path back to the point of origin through a coating system. In the discussion below, the coating system may be an electrophoretic coating system. The belt apparatus may include a movable belt to which the objects are releasably secured for movement with the belt. The belt may be formed from a series of belt segments that are affixed to one another by means of coupling devices to form a continuous belt of a desired length. The belt segments can be of any desired length, and the belt segments that form the belt need not be of a uniform length. A number of clip assemblies may be affixed to the belt and act to accept, retain, convey, and release objects as and where required. The clip assemblies may contact, for example, a shaft of the bolt, which is a non-Class A surface. In this embodiment, the Class A surfaces of the bolt, including the bolt shaft, need not be in contact with any part of the belt apparatus. Therefore, no touch points are created on the Class A surfaces of the bolt by the belt apparatus. The movement of the belt, and, accordingly, the movement of the objects that are attached to the belt, may be controlled by a drive system. The drive system can be any known system for driving known continuous belt conveyor systems, or it can be of the type that is shown in the Figures. Objects may be fed to and inserted into the clip assemblies using any of the known prior art feed systems. A suitable feed system is shown in the Figures. The objects may be released from the clips by a deflector guide that may be positioned at a desired destination point within the coating system. A scraper station may be employed as a part of the belt apparatus and functions to remove foreign matter from the sides of the belt for purposes of maintaining electrical grounding capability, if required by the coating system.

The embodiments described herewithin may be constructed from stainless steel or other suitable metal alternative for one or more reasons including: first, so the apparatus can be used in a coating system where it may be exposed to chemicals, heat extremes, or other adverse conditions or elements that would deteriorate or destroy other material types; second, to provide rigidity; and/or third, for durability. Other materials may be used as dictated by the requirements of the coating system.

Turning now to the drawings, FIGS. 1-7 illustrate embodiments of the continuous belt 10 employed in the system and method of the present invention. The continuous belt 10 releasably retains one or more objects 20 thereto for subsequent treatment through a coating process, described below. The belt 10 includes a belt strip 14 that is continuous, i.e., it is, or may be, attached end-to-end to form an endless loop when positioned on a drive mechanism, described below. On belt strip 14 may be attached at least one retaining member 12. Belt 10 may be formed of any durable material known in the art for withstanding the temperatures and conditions associated with the continuous coating of objects. Typically, belt 10 is formed of a corrosion-resistant conductive material, for example, aluminum or stainless steel. Although belt 10 is shown in a horizontal configuration it is understood that other configurations, such as, for example, a vertical configuration, or an angled configuration, may be employed and that such modifications are intended to be included within the scope of the present invention.

Retaining member 12 may be positioned on belt 10 and may include a retaining portion 16 that, in an open position, can exert pressure against object 20 in order to retain object 20 to belt 10. Retaining member 12 may be any size or shape to aid in the retention of the object 20 to belt 10. For example, retaining member 12 may be a spring-loaded clip-type retaining member having a retaining portion 16 in the form of an extended arm portion that may be positionable over the elongate portion 21 of object 20 when object 20 is properly oriented on belt 10. Retaining member 12 may be formed of any resilient material that securely retains object 20 to belt 10. In certain embodiments of the present invention, retaining member 12 may be formed of a flexible corrosion-resistant conductive material, such as aluminum or stainless steel. Retaining member 12 may be secured to belt 10 by any manner known in the art. For example, retaining member 12 may include a base plate 11 that is secured to the strip 14 of the belt 10 by fasteners 13 that extend through the strip 14. Any suitable fasteners 13 may be employed to affix the retaining member 12 to the belt 20, such as, for example, rivets, bolts, screws, and the like.

Retaining portion 16 may be any size or shape that aids in releasably retaining object 20 to belt 10. For example, and as illustrated in FIGS. 1-4, retaining portion 16 may be in the form of an extended arm portion in the general shape of a "Lazy S" that may be attached to base plate 11 at one end, and positionable to extend over the object 20 at the other end. Retaining portion 16 may include an indented saddle portion 19 that may be shaped to receive, and be in a mating configuration with, the outer surface of the elongate portion 21 of object 20 to assist in releasably retaining object 20 to belt 10. Although the saddle portion 19 may be any shape or configuration to releasably retain the object 20 to the belt 10, the saddle portion 19 may be a convex arcuate-shaped member for retaining a cylindrically-shaped elongate portion, such as a bolt shaft, as illustrated. To assist in positioning object 20 into retaining engagement with retaining portion 16, retaining portion 16 may further include an upturned portion 17 that acts to lift retaining portion 16 from a closed position to an open position over the outer surface of object 20, as described in detail below. Retaining portion 16 may be formed of any material suitable for releasably retaining object 20 to belt 10. Typically, retaining portion 16 is formed of a material that is compatible with the material that forms retaining member 12. In certain embodiments of the present invention, retaining portion 16 is formed of a flexible corrosion-resistant conductive material, such as aluminum or stainless steel. Although the retaining portion 16 may be any suitable thickness, when retaining portion 16 is formed of stainless steel, retaining portion 16 may be 0.50 to 0.70 mm thick.

Figure 5:
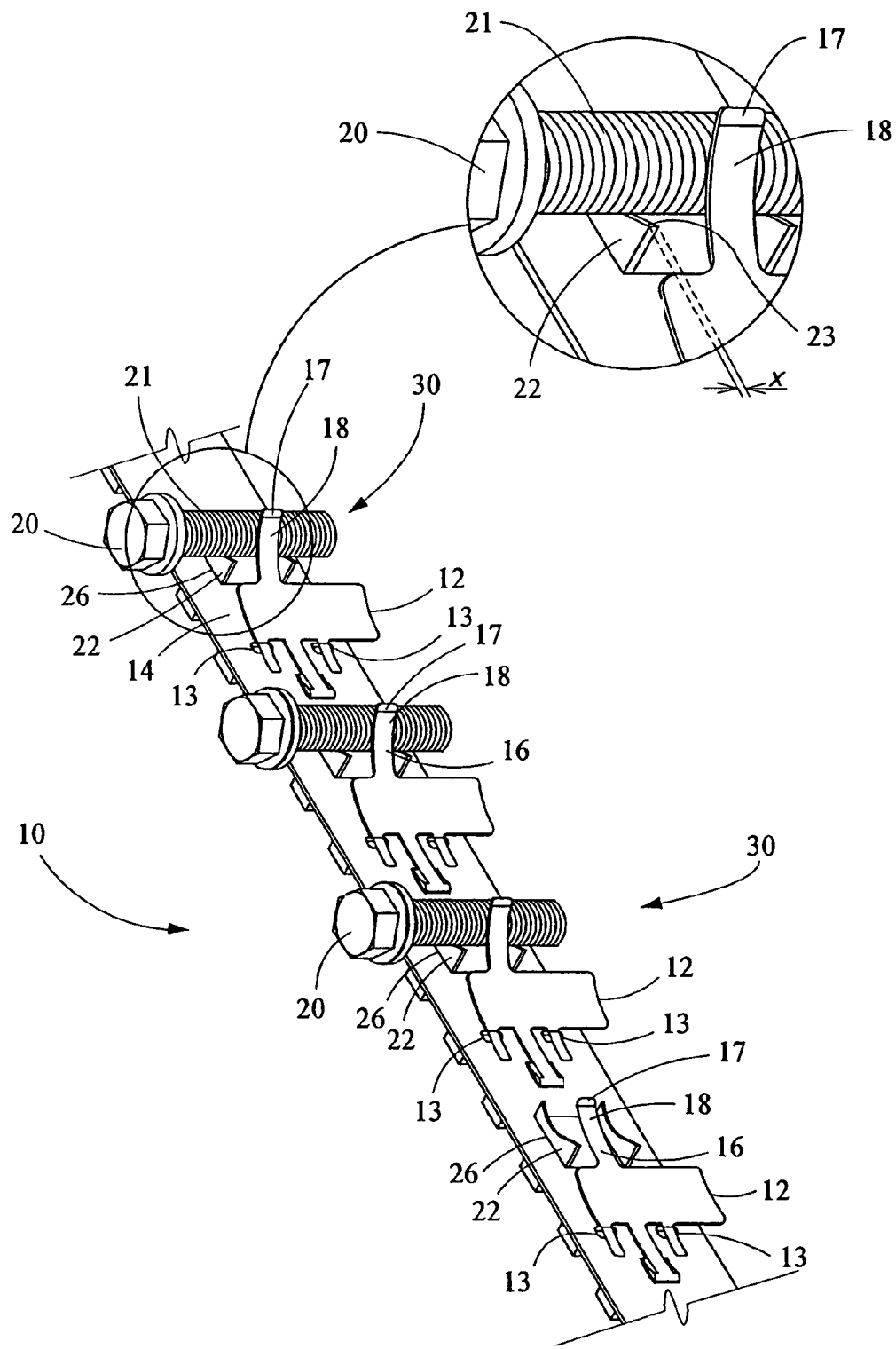
FIG. 5 is a perspective view of a second embodiment of the continuous belt of the present invention, releasably retaining an object in the form of a threaded bolt and washer.
Figures 6, 7:
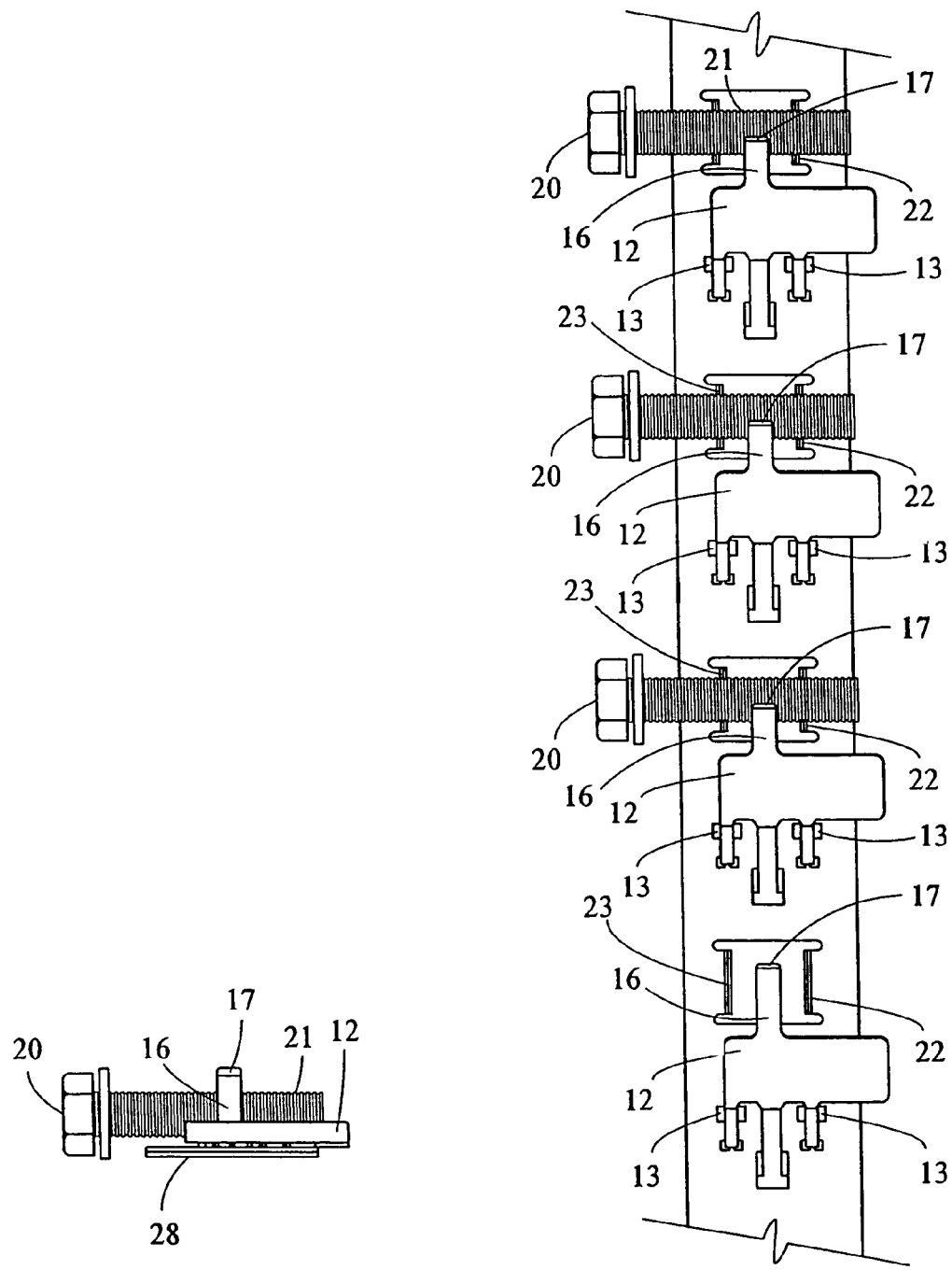
FIG. 6 is a top plan view of the continuous belt, illustrated in FIG. 5.
FIG. 7 is a side elevation view of the continuous belt, as illustrated in FIG. 5.

In another embodiment of the present invention illustrated in FIGS. 5-7, retaining member 12 may be a rectangular panel portion that includes a retaining portion 16 to aid in retaining object 20 to belt 10. As illustrated, retaining portion 16 may be in the form of a flexible arm portion that extends from retaining member 12 and is integral therewith to releasably retain object 20 to belt 10. In this embodiment, retaining member 12 may be secured to belt 10 by inserting fasteners 13 through leg portions of retaining member 12 and to belt 10.

It is contemplated that more than one retaining portion 16 may be included with retaining member 12. It is also contemplated that retaining portion 16 may include more than one end for retaining the object 20, such as, for example, a forked or pronged end, having two or more branched end portions, which extend over elongate portion 21 of object 20.

Belt 10 may further include at least one guide member 22 engaging belt 10. When guide member 22 is present, retaining member 12 is positionable relative to guide member 22 to releasably retain object 20 and, more particularly, the elongate portion 21, therebetween. In this form, retaining member 12 and guide member 22 form a retaining unit or clip assembly 30. Guide member 22 may be any size or shape to aid in the releasable retention of object 20 between it and retaining member 12, and may be formed of any material suitable for that purpose. Typically, guide member 22 is formed of a material that is compatible with the material that forms retaining member 12. In certain embodiments of the present invention, guide member 22 is formed of a corrosion-resistant conductive material, such as aluminum or stainless steel. Guide member 22 may be secured to strip portion 14 of the belt 10 by any secure manner known to those in the art. For example, guide member 22 may have a base 26 that is secured to the strip 14 of the belt 10 by fasteners (not shown) that extend through the strip 14. Any suitable fasteners may be employed to affix the guide member 22 to the belt 20, such as, for example, rivets, bolts, screws, and the like.

As illustrated in FIGS. 1-7, guide members 22 may be in the form of one or more sloping members, at least a portion of which has a decreasing height as measured from its base. Although any number of sloping members may be employed, guide member 22 may include a pair of sloping members. For example, and as illustrated, guide member 22 may be in the form of a pair of arcuate sloping members (FIGS. 1-4) or in the form of a pair of wedge-shaped bodies (FIGS. 5-7) wherein at least a portion of the guide member 22 includes a sloping portion 24 having a decreasing height as measured from its base 26. The sloping portion 24 of guide member 22 may be in various orientations to aid in guiding and/or retaining the object 20 between the retaining member 12 and the guide member 22. In one embodiment, illustrated in FIGS. 1-4, the sloping members may be in the shape of a downwardly sloping arcuate ramp that has a slight upturn at the saddle portion 23 nearest the retaining member 12. In another embodiment, illustrated in FIGS. 5-7, the sloping members may be wedge-shaped members 22 having their greatest height nearest the retaining member 12 that forms the retaining unit 30.

Each sloping member of the guide member 22, whether arcuate, wedge-shaped, or otherwise, may have any suitable thickness, identified as x, to effectively guide the object 20 into engagement with the retaining member 12. In certain embodiments of the present invention wherein the object 20 includes a grooved or threaded elongate portion, such as, for example, a threaded shaft of a bolt, the thickness x of each sloping member may be less than the distance that separates two individual threads on the elongate portion 21 such that when the object 20 is positioned on the guide member 22, at least a portion of each sloping member may be retained between the threads of the elongate portion 21 to provide additional retaining force when the object 20 is releaseably retained between the retaining member 12 and the guide member 22.

The guide member 22 may further include an indented saddle portion 23 that may be shaped to receive, and be in a mating configuration with, the outer surface of the elongate portion 21 of the object 20 to assist in releaseably retaining object 20 to belt 10. Although the saddle portion 23 may be any shape or configuration to securely retain the object 20 to the belt 10, saddle portion 23 may be a concave arcuate-shaped member if the elongate portion 21 of the object 20 to be retained is a cylindrical elongate portion, such as a shaft of a bolt, as illustrated.

In certain embodiments of the present invention, and as best illustrated in FIGS. 1 and 5, belt 10 may include a plurality of retaining members 12 and guide members 22, with each retaining member 12 being positioned relative to each respective guide member 22 to form a plurality of retaining units 30 positioned along the belt 10. In this form, each respective retaining unit 30 is positioned to releasably retain an object 20. Typically, when the objects 20 are non-uniformly shaped, each retaining unit 30 may be positioned to releasably retain each respective object 20 in the same lateral direction as an adjacent retaining unit 30. For example, and as illustrated, when object 20 is a threaded bolt, each bolt shaft may be retained in the retaining unit 30 such that each head of each respective bolt is positioned to be in the same side of belt 10. In this manner, the coating may be more easily deposited on the Class A surfaces of objects 20 by the process of the present invention.

It is contemplated that belt 10 of the present invention may be employed to releasably retain various objects for coating. For example, it is contemplated that objects of various sizes and shapes may be releasably retained by belt 10, such as, for example, small parts, such as fasteners, nuts, bolts, screws, pins, nails, clips, buttons, and small size stampings, castings, wire goods, hardware, and the like. As illustrated, in certain embodiments of the present invention, belt 10, and more specifically, retaining member 12 and, optionally, guide member 22, may be employed to retain objects 20 at points along the elongate portion 21 representing non-Class A portions of the object that avoid marring or, otherwise, damaging the coating of the Class A surfaces of the coated object.

It is contemplated that in embodiments of the present invention, one or more of the belt components, such as retaining member 12, retaining portion 16, and guide member 22, may be detachable for easy replacement. It is also contemplated that the belt components may be adjustable and positionable to releasably retain objects of varying sizes such that a single belt 10 may be employed on a production line to coat a series of different sized objects having, for example, differing diameters, lengths, and the like. In this form, belt replacement could be reduced or substantially eliminated between runs of various sized objects (e.g. bolts of differing diameters or lengths) or entirely different objects (e.g. a run of bolts immediately followed by a run of screws). For example, guide member 22 may be detachably or slidably engaged to belt 10 so that the arcuate sloping members or wedge-shaped members, for example, can be independently adjusted in a lateral direction, in a side-to-side direction, or a combination of directions to receive different sized objects. The manner in which the components of belt 10 may be adjusted can be accomplished by various methods known to one of ordinary skill in the art, such as, for example, through a plurality of predrilled holes (not shown) through strip 14 of belt 10 that are positioned to receive the components at various distances or locations. The components could be secured to belt 10 by threaded engagement to the predrilled holes that correspond to the suitably sized object. Furthermore, tracks (not shown) attached to strip 14 may allow the components to be slidably attached and locked to belt 10 at various locations along the track.

Figure 4:
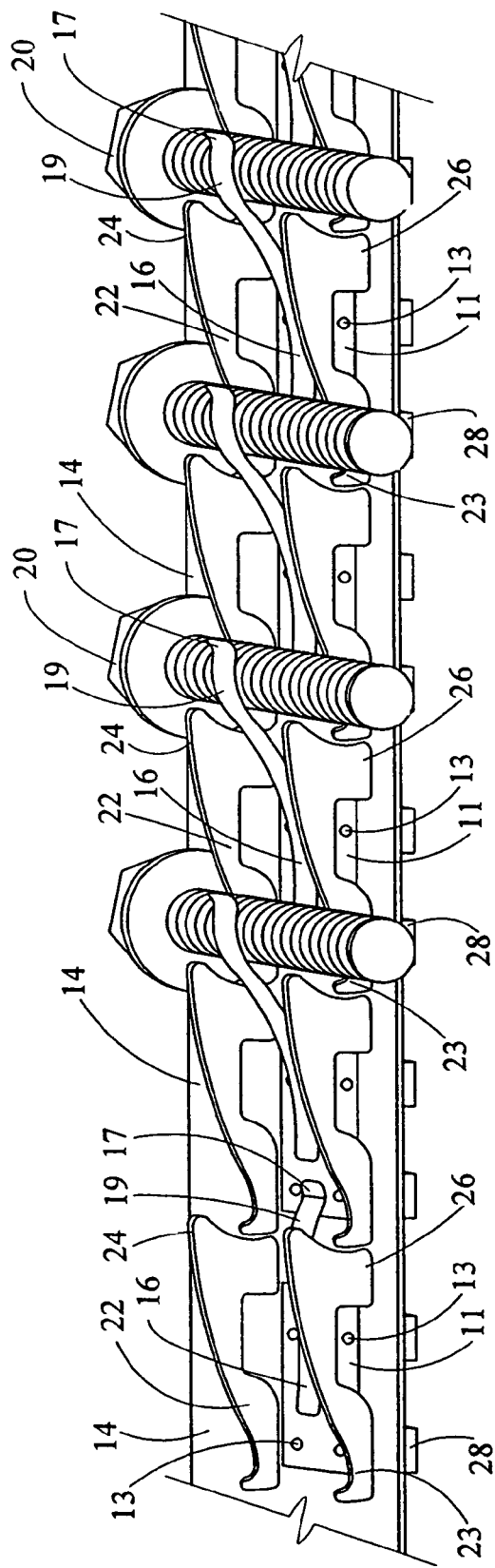
FIG. 4 is a perspective view of the continuous belt, as illustrated in FIG. 1.

As best illustrated in FIGS. 1, 4, and 7, when the process for coating object 20 is an electrophoretic coating process, belt 10 of the present invention may include at least one electrical grounding member 28 positioned on belt 10, and typically includes a plurality of grounding members 28 positioned along belt 10 to ensure a satisfactory ground for the electrical circuit in the process. When employed, electrical grounding members 28 may be positioned on a side of strip 14 of belt 10 directly opposite one or both of retaining member 12 and guide member 22. In certain embodiments of the present invention, and as illustrated in the Figures, grounding members 28 may each be an electrically conductive plate or bar that is secured to one side of strip 14 of belt 10 and positioned directly opposite one or both of retaining member 12 and guide member 22, and may be held in place by the same fasteners 13, such as rivets, used to secure retaining member 12 and/or guide member 22 to the belt 20. Fasteners 13 may also be formed of an electrically conducting material, such as stainless steel or aluminum, so that as belt 10 is conveyed by a drive mechanism, grounding members 28 contact at least one component of the coating system, such as the drive mechanism, as described below, to electrically ground belt 10.

Figure 9A:
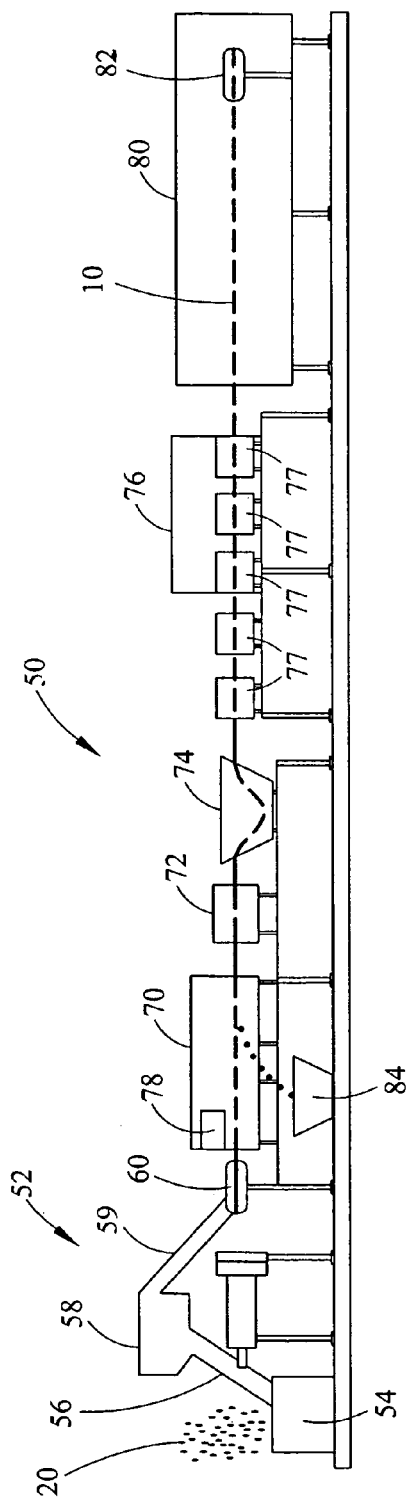
FIG. 9A is a schematic side elevation view of the coating system of the present invention.
Figure 9B:
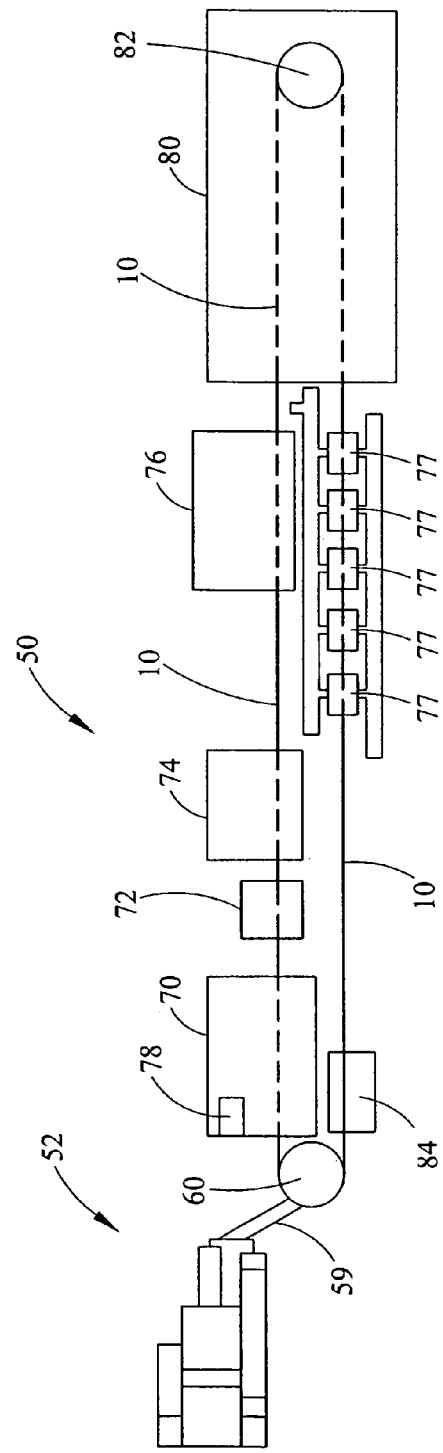
FIG. 9B is a top plan view of the coating system of the present invention.

Turning now to FIGS. 9A and 9B, the continuous belt 10 of the present invention may be employed in a continuous coating system 50 that may include a drive mechanism or system 60, 82 in operative engagement with the continuous belt 10 for conveying as an endless system through an optional pretreatment unit 70, coating unit 74, rinse unit 76, and drying unit 80. Coating system 50 employed in the present invention may be any electrophoretic coating system for coating conductive objects known to those of ordinary skill in the art and may include, for example, electrodeposition coating systems or processes. Although any continuous electrophoretic coating system may be employed in the present invention, for illustrative purposes only, and without intending to be limited to any particular embodiment, the continuous system 50 will be described and illustrated in the form of an electrodeposition coating system for coating a metallic object.

Although the objects 20 may be manually fed onto the continuous belt 10, the continuous coating system 50 of the present invention typically includes an object feeding mechanism 52 for receiving, orienting, and feeding objects to be coated. The feeding mechanism 52 typically includes a hopper 54, for receiving a bulk load of objects 20, and one or more conveyors 56, 59 for transporting objects from the hopper 54 in a streaming queue to a pick-up point at the belt 10, as described in detail below. The conveyors 56, 59 may be of any conventional type, such as, but not limited to, a belt conveyor, a chain conveyor, a platform conveyor, a gravity conveyor, and the like. The feeding mechanism 52 may also include a conventional sorting device 58 for orienting the objects in the same, general, direction so that the objects may be transported from the conveyor 56 onto the continuous belt 10 in the same lateral direction. The feeding mechanism 52 employed in the present invention may be one that is well known in the art, or may be assembled from various conventional hopper, sorting, and conveying components. For example, if the object 20 to be coated is a threaded bolt, suitable bolt hopper, bolt sorter and bolt conveyor mechanisms are commercially available from Spectrum Automation Company, Livonia, Mich. It is contemplated that various object feeding mechanisms may be employed in the present invention such as, for example, a bolt, screw, nut, and washer feeding mechanism.

Feeding mechanism 52, and, more specifically, conveyor 59 may feed a plurality of objects 20 onto continuous belt 10 as a streaming queue to a pick-up point at the belt 10 by methods well known to those of ordinary skill in the art. In particular, and as discussed in detail below, the path of each object 20 on the conveyor 59 is along a path that is in general alignment and engagement with each retaining member 12 on belt 10, or optionally, guide member 22, if present.

Figure 8A:
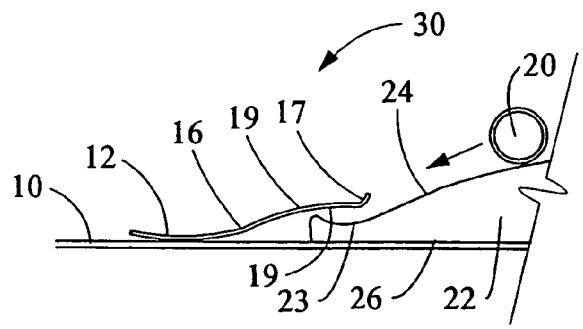
FIGS. 8a-8d are a series of side elevation views illustrating releasable retention of an object to the continuous belt of FIG. 1.
Figure 8B:
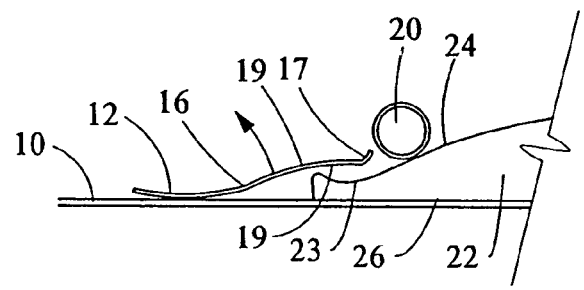
Figure 8C:
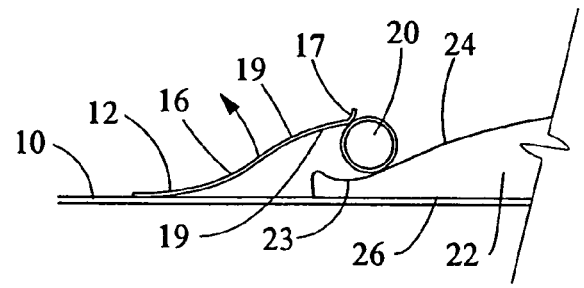
Figure 8D:
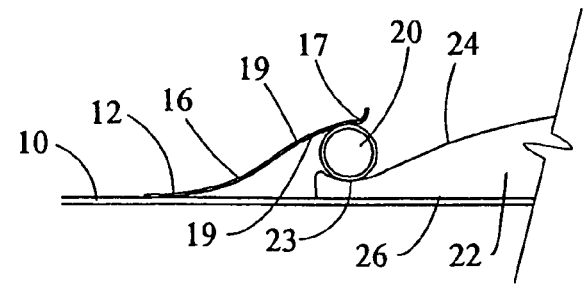

As best illustrated in FIGS. 8a-8d, when continuous belt 10 includes guide member 22, guide member 22 may be positioned to receive object 20 from feeding mechanism 52, and particularly conveyor 59 to guide object 20 toward retaining member 12. As discussed above, guide member 22 may include, for example, a pair of arcuate sloping members or wedge-shaped members that include a sloping portion 24 having a decreasing height as measured from base 26. Object 20 may be delivered from feeding mechanism 52 and positioned on guide member 22 such that sloping portion 24 of guide member 22 assists in channeling object 20 toward retaining member 12 that is in a closed or partially closed position (FIGS. 8a, 8b). If the elongate portion of object 20 is threaded, guide member 22, in the form of arcuate sloping members or wedge-shaped members, each may be at least partially retained between the threads on the elongate portion to provide additional retaining force with the object 20. As illustrated in FIG. 8c, as object 20 is channeled along guide member 22, object 20 contacts retaining portion 16 of retaining member 12 in a closed or partially closed position. The force of object 20 contacting the flexible retaining portion 16 causes retaining portion 16 to open (in the direction of the arrow), for receipt of the object 20. Upturned end portion 17 of retaining portion 16 may provide additional surface area for channeled object 20 to forcibly open retaining portion 16. In this manner, retaining member 12 and retaining portion 16 are forced into an open position, such that retaining portion 16 extends over object 20, in the manner of a spring clip, to releasable retain the object 20 to belt 10 (FIG. 8d). If the retaining portion 16 includes saddle portion 19, retaining portion 16 may be lifted over object 20 until the outer surface of the elongate portion 21 of object 20 is positioned to be in alignment with the mating configuration of saddle portion 19. In like manner, guide member 22 may include saddle portion 23 that may be in the shape of, and in a mating configuration with, the outer surface of the elongate portion 21 of object 20 to assist in retaining object 20 to belt 10.

Typically, the present invention includes a plurality of retaining members 12 and guide members 22 positioned along continuous belt 10, with each retaining member 12 positioned relative to each respective guide member 22 to form a plurality of retaining units 30. In this form, each retaining unit 30 is positioned along belt 10 to receive and retain an object 20, as discussed above, as it is fed from feeding mechanism 52.

Referring again to FIGS. 9A and 9B, automated conveyor 59 may be employed as a part of the feeding mechanism 52, to position each object 20 into engagement with each respective retaining unit 30 in the same lateral direction as an adjacent retaining unit 30, as previously illustrated. For example, when the object 20 is a threaded bolt, each bolt is retained in the retaining unit 30 such that each head of each respective bolt is positioned to be in the same side of the belt 20. Belt 10 and feeding mechanism 52 may be in cooperative arrangement such that a missed object will be dropped into a collection unit (not shown) and recycled back into the feeding mechanism 52, leaving a void in the loaded belt, rather than a system stoppage.

As objects 20 are fed from feeding mechanism 52 into releasable retention with the retaining unit 30 on continuous belt 10, the retained objects travel along a path of the moving belt 10, driven by drive mechanism 60 and/or 82. The drive mechanism 60, 82 may be in operative engagement with the continuous belt 10 by any means known to those of ordinary skill in the art, such as, for example, by conventional rack and pinion engagement, or in the translational arrangement described below, to provide movement to the belt 10 and, consequently, to the objects 20. The speed of belt 10, as conveyed by drive mechanism 60, 82, may be at a speed that is in operative association with the speed at which objects 20 are being fed from the conveyor 59 of feeding mechanism 52. Although the rate of travel of belt 10 through the coating system 50 may be at any rate, continuous line production may be at about 18.75 feet per minute (5.72 meters per minute). Accordingly, positioning of each object 20 approximately 1.5 inches (3.8 cm) apart from center to center, allows for approximately 150 objects per minute to travel through the coating system 50.

As discussed above, when the process for coating object 20 is an electrophoretic coating process, such as an electrodeposition coating process, belt 10 of the present invention may include at least one electrical grounding member 28, and typically a plurality of grounding members 28, positioned on belt 10 to ensure a satisfactory ground for the electrical circuit in the process. Accordingly, as the drive mechanism 60, 82 conveys the belt 10, the grounding members 28, positioned on one side of belt 10 and formed of an electrically conducting material, may ride over and contact at least one component of coating system 50 such as, for example, portions of drive mechanism 60, 82, belt guide (described below), or scraper assembly (described below) which is, itself, grounded.

Before depositing coatings on the surface of the substrate, it may be necessary to remove foreign matter from the metal surface by thoroughly cleaning and/or degreasing the substrate surface. In this regard, optional pretreatment unit 70 may include a cleaning system that prepares the surface of the object 20 for coating. The surface of the substrate can be cleaned by any physical or chemical means known in the art, such as mechanically abrading the surface or, as is typical, cleaning/degreasing with commercially available alkaline or acidic cleaning agents that are well known to those skilled in the art, such as sodium metasilicate and sodium hydroxide. Non-limiting examples of suitable cleaning agents include CHEMKLEEN® 163 and CHEMKLEEN® 177 phosphate cleaners, both of which are commercially available from PPG Industries, Inc. of Pittsburgh, Pa.

Following, or in lieu of, the cleaning step, the surface of the substrate may be rinsed with water, typically deionized water, in order to remove any residue. Optionally, the metal surface can be rinsed with an aqueous acidic solution after cleaning with the alkaline cleaners. Examples of rinse solutions include mild or strong acidic cleaners such as the dilute nitric acid solutions commercially available and conventionally used in, for example, metal pretreatment processes. The metallic substrate may be air-dried using an air knife, by flashing off the water by brief exposure of the substrate to a high temperature or by passing the substrate between squeegee rolls.

Optionally, a phosphate-based pretreatment or conversion coating can be applied to the metallic substrate. Suitable phosphate conversion coating compositions include those known in the art, such as zinc phosphate, optionally modified with nickel, iron, manganese, calcium, magnesium or cobalt. Useful phosphating compositions are described in U.S. Pat. Nos. 4,793,867 and 5,588,989; 4,941,930; 5,238,506 and 5,653,790.

A drying/preheating mechanism may be employed to dry and/or preheat the objects 20 as they pass through the pretreatment unit 70 prior to being charged for coating in the coating unit 74. Any drying and/or preheating method known to those skilled in the art may be employed in the pretreatment unit 70, such as for example, infrared, electron beam, actinic radiation, convection, induction, and combinations thereof. The pretreatment unit 70 may also be hooded, as illustrated, depending on the cleaning solution employed.

Following the optional pretreatment stage, and prior to entering and/or while in the coating unit 74, objects 20 may be charged by a conductor 72. Electrical current is applied on one polarity from conductor 72 to the electrodeposition bath and in the opposite polarity to the conductive belt 10, and thereby to the object 20. In the process of the present invention, the object 20 serves as an electrode, typically the cathode, in an electrical circuit comprising the electrode and a counter-electrode that are immersed in an aqueous electrodepositable coating composition.

Generally, in the process of applying the electrodepositable coating, the aqueous dispersion of the electrodepositable composition is placed in contact with an electrically conductive anode and cathode. Upon passage of an electric current between the anode and cathode, an adherent film of the electrodepositable composition will deposit in a substantially continuous manner on the substrate serving as either the anode or the cathode depending on whether the composition is anionically or cationically electrodepositable. Although any suitable voltage may be employed to charge conductive belt 10, the voltage employed may be dependent on the size and shape of the object 20 to be coated, and the applied coating material. Electrodeposition is usually carried out at a constant voltage ranging from 1 volt to 7,000 volts, and typically between 50 and 500 volts. Current density is usually between about 1.0 ampere and 15 amperes per square foot (10.8 to 161.5 amperes per square meter). If the coating material used is anionic, the belt 10 is supplied with an anionic charge, whereas if the coating material used is cationic, the belt 10 is supplied with a cationic charge.

Coating unit 74 may contain an electrodepositable coating material, drawing such material from a storage unit, such as a mother tank, and is positioned to coat all or a portion of objects 20 releasably retained on the belt 10. The coating system 50 may also employ a recirculation system that allows the coating unit 74 and the storage unit to be in fluid communication. Any electrophoretic coating unit may be employed in the continuous coating system 50 of the present invention, such as, for example, an electrodeposition tank, and the like. As illustrated, the coating unit 74 includes an electrodeposition tank.

The electrodeposition bath composition may be employed in a tank as one embodiment in the methods of the present invention, and may comprise a resinous phase dispersed in an aqueous medium. The resinous phase includes a film-forming organic component which can comprise an anionic electrodepositable coating composition, or, as is typical, a cationic electrodepositable coating composition. The polymeric electrodepositable coating composition typically comprises an active hydrogen group-containing ionic resin and a curing agent having functional groups reactive with the active hydrogens of the ionic resin.

As used herein, the term "reactive" refers to a functional group that forms a covalent bond with another functional group under suitable reaction conditions.

Non-limiting examples of anionic electrodepositable coating compositions include those comprising an ungelled, water-dispersible electrodepositable anionic film-forming resin. Examples of film-forming resins suitable for use in anionic electrodeposition coating compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Yet another suitable electrodepositable anionic resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13. Other acid functional polymers can also be used such as phosphatized polyepoxide or phosphatized acrylic polymers as are well known to those skilled in the art.

By "ungelled" is meant that the polymer is substantially free of crosslinking and has an intrinsic viscosity when dissolved in a suitable solvent. The intrinsic viscosity of a polymer is an indication of its molecular weight. A gelled polymer, on the other hand, since it is of essentially infinitely high molecular weight, will have an intrinsic viscosity too high to measure.

With reference to the cationic resin, a wide variety of cationic polymers are known and can be used in the compositions of the invention so long as the polymers are "water dispersible," i.e., adapted to be solubilized, dispersed, or emulsified in water. The water dispersible resin is cationic in nature, that is, the polymer contains cationic functional groups to impart a positive charge. Typically, the cationic resin also contains active hydrogen groups.

Examples of cationic resins suitable include onium salt group-containing resins such as ternary sulfonium salt group-containing resins and quaternary phosphonium salt-group containing resins, for example, those described in U.S. Pat. Nos. 3,793,278 and 3,984,922, respectively. Other suitable onium salt group-containing resins include quaternary ammonium salt group-containing resins, for example, those that are formed from reacting an organic polyepoxide with a tertiary amine salt. Such resins are described in U.S. Pat. Nos. 3,962,165; 3,975,346; and 4,001,101. Also suitable are the amine salt group-containing resins such as the acid-solubilized reaction products of polyepoxides and primary or secondary amines such as those described in U.S. Pat. Nos. 3,663,389; 3,984,299; 3,947,338 and 3,947,339.

Usually, the above-described salt group-containing resins described above are used in combination with a blocked isocyanate curing agent. The isocyanate can be fully blocked as described in the aforementioned U.S. Pat. No. 3,984,299 or the isocyanate can be partially blocked and reacted with the resin backbone such as is described in U.S. Pat. No. 3,947,338.

Also, one-component compositions as described in U.S. Pat. No. 4,134,866 and DE-OS No. 2,707,405 can be used as the cationic resin. Besides the epoxy-amine reaction products, resins can also be selected from cationic acrylic resins such as those described in U.S. Pat. Nos. 3,455,806 and 3,928,157. Also, cationic resins which cure via transesterification such as described in European Application No. 12463 can be used. Further, cationic compositions prepared from Mannich bases such as described in U.S. Pat. No. 4,134,932 can be used. Also useful in the electrodepositable coating compositions of the present invention are those positively charged resins that contain primary and/or secondary amine groups. Such resins are described in U.S. Pat. Nos. 3,663,389; 3,947,339; and 4,115,900. U.S. Pat. No. 3,947,339 describes a polyketimine derivative of a polyamine such as diethylenetriamine or triethylenetetraamine with the excess polyamine vacuum stripped from the reaction mixture. Such products are described in U.S. Pat. Nos. 3,663,389 and 4,116,900.

In one embodiment of the present invention, the cationic resins suitable for inclusion in the electrodepositable coating compositions useful in the methods of the present invention are onium salt group-containing acrylic resins.

The cationic resin described immediately above is typically present in the electrodepositable coating compositions in amounts of 1 to 60 weight percent, preferably 5 to 25 weight percent based on total weight of the composition.

As previously discussed, the electrodepositable coating compositions which are useful in the methods of the present invention typically further comprise a curing agent which contains functional groups which are reactive with the active hydrogen groups of the ionic resin.

Aminoplast resins, which are the preferred curing agents for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from American Cyanamid Co. under the trademark CYMEL® and from Monsanto Chemical Co. under the trademark RESIMENE®.

The aminoplast curing agents are typically utilized in conjunction with the active hydrogen containing anionic electrodepositable resin in amounts ranging from about 5 percent to about 60 percent by weight, preferably from about 20 percent to about 40 percent by weight, the percentages based on the total weight of the resin solids in the electrodeposition bath.

The curing agents most often employed for cationic electrodepositable coating compositions are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30. By "blocked" is meant that the isocyanate groups have been reacted with a compound so that the resultant blocked isocyanate group is stable to active hydrogens at ambient temperature but reactive with active hydrogens in the film forming polymer at elevated temperatures, usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the cationic resin in amounts ranging from 1 weight percent to 65 weight percent, preferably from 5 weight percent to 45 weight percent, based on the weight of the total resin solids present composition.

The aqueous compositions of the present invention are in the form of an aqueous dispersion. The term "dispersion" is believed to be a two-phase transcoating, translucent or opaque resinous system in which the resin is in the dispersed phase and the water is in the continuous phase. The average particle size of the resinous phase is generally less than 1.0 and usually less than 0.5 microns, and may be less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

Electrodeposition baths useful in the methods of the present invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

The electrodeposition bath of the present invention has a resin solids content usually within the range of about 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, typically from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like.

The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

As the belt 10 is carried through coating unit 74, the polymeric composition is deposited onto the Class A surfaces of the object 20 as a substantially continuous coating as electric current is passed between the two electrodes. As described above, and by way of example, when the object 20 is a threaded bolt, and, optionally, an integral washer, as illustrated, each respective retaining unit 30 on the belt 10 may be positioned to releasably retain each respective threaded bolt in the same lateral direction. As a result, each bolt is positioned on belt 10 such that each bolt head is on the same side of the belt 10. In this manner, the Class A surfaces of the bolt and washer are more easily coated by the coating materials in coating unit 74. As the belt 10 carries the bolts from optional pretreatment unit 70 and into the coating unit 74, the belt 10 may be rotated, for example, from a horizontal position to an angled or vertical position, or from a vertical position to an angled position such that electrophoretic material may more readily be deposited on the bolt and washer substantially or completely cover the entirety of the Class A surfaces thereof.

The coating unit 74 may also serve as a reservoir to collect excess coating material from the exterior surface of the object 20 as the coated object is carried away by the belt 10 after coating, to prevent waste thereof. In this manner, the electrophoretic coating may be deposited upon the object 20 to a desired thickness based on various factors, such as the speed of belt 10, the composition of the coating material, the temperature of coating unit 74, and the like. Typically, the temperature of the coating unit 74 and coating material is maintained in the range of, for example, 31.1 to 33.3° C. Coating times through the coating unit may vary considerably and depend on voltage, temperature and composition of the coating material, desired film thickness, and the like. Typical coating time is 20 seconds, and may range from, for example, 10 to 60 seconds.

The excess coating material may be rinsed from coated object by one or more rinsing units 76 positioned downstream from the coating unit 74. Air knives (not shown) may be employed to remove excess rinse water from the objects. The rinsing unit 76 may include a recycle system for returning excess material to the mother tank for reuse. Deionized water and/or permeate from an ultrafiltration system 78 may be used for rinsing the excess material from the object 20. The rinse water may be filtered and expelled from coating system 50, or may be recycled back through the system for reuse in order to provide a closed, non-polluting system.

The coated and, optionally, rinsed object 20 may then move through a drying unit 80 to dry the coating deposited on object 20. As used herein the terms "dry", "dried", or "drying" is intended to include both drying and curing. In one embodiment, the electrodeposited coating is dried by driving substantially all the solvent and/or water from the coating either by evaporation at ambient temperature or by forced drying at elevated temperatures (for example 150° F. to 800° F. (82° C. to 426° C.)). The term "dried" is also intended to include "cured," for example, by exposing the electrocoated substrate to thermal conditions sufficient to crosslink the co-reactive film components.

Also, as used herein, the term "cure" as used in connection with a composition, e.g., "a cured composition," shall mean that any crosslinkable or co-reactive components of the composition are at least partially crosslinked or co-reacted. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01 N, and sample measurements occur every two seconds. The mode of deformation, glass transition temperature, and crosslink density of the sample can be determined according to this method. Higher crosslink density values indicate a higher degree of crosslinking in the coating.

Generally, the electrodepositable coating compositions which are useful in the methods of the present invention are applied under conditions such that a substantially continuous coating having a dried film-thickness ranging from 0.1 to 1.0 mils (2.54 to 25.4 micrometers), usually from 0.6 to 0.8 mils (15.24 to 20.32 micrometers) is formed upon the Class A surfaces of the object 20.

Any method known to those skilled in the art of drying the applied coating may be employed, such as for example, infrared, electron beam, actinic radiation, convection, induction, and combinations thereof. For example, drying unit 80 of continuous system 50 may employ heat treatment to the coating by the combination of infared radiation and convection. In one embodiment of the present invention, after the coating has been applied by electrodeposition, it is cured, usually by heating, at elevated temperatures ranging from 90° C. to 430° C. for a period ranging from 60 to 1200 seconds. Alternatively, the coating can be cured using infrared curing techniques as are well known in the art, typically for a period ranging from 45 to 240 seconds or a time sufficient to obtain a peak metal temperature ranging from 300° F. to 550° F. (149° C. to 288° C.). For non-metallic substrates, such as conductive non-metallic substrates, the times and temperatures may be adjusted and depend, at least in part, on the particular substrate material employed.

In one embodiment of the present invention, a cooling unit 77, such as a refrigeration unit, a chiller, or a series of blowers 77, may be positioned after the drying unit 80 to lower the temperature of the objects 20 exiting the drying unit 80 for handling and transport. When blowers 77 are employed, air may be blown over objects 20 at any suitable velocity and temperature, and may range from, for example, 16000 to 18,000 ft/min (81 to 91 m/s) at ambient. Typically, the blowers 77 reduce the surface temperature of the objects 20 to below 140° F. (60° C.). For efficiency, exhaust from the blowers 77 may be employed after rinse unit 76 and before drying unit 80 to aid in removing excess rinse water from the objects 20 following rinsing and prior to the objects 20 being transported through the drying unit 80.

After exiting drying unit 80 and passing through the optional cooling unit 77, objects 20 may be released from the belt 10 by manual or automated means. Suitable releasing means include gravity driven means wherein as the belt 10 is conveyed over a dispensing wheel (not shown), the movement of the belt 10 around the wheel, with the aid of gravity, acts to release each object 20 from each retaining member 12, such that retaining member 12 and retaining potion 16 are returned to their closed or partially closed position. In another embodiment and as described in detail below, objects 20 may be released from belt 10 by a deflector guide after the belt 10 makes its return. The released and coated object 20 may then be deposited in receptacle 84 for packing or for further processing. Continuous conveyance of the continuous belt 10 returns the closed or partially closed retaining member 12 back to the feeding mechanism 52 for receipt of another object 20 for releasable retention therewith and coating.

Although the coating system 50 set forth above has been described as applying a single coating over the object 20, it is contemplated that more that one coating may be deposited on the object 20. For example, two or more layers of coating may be deposited on object 20 by adding additional coating and drying units to the coating system 50 described above, or by running coated objects through the coating system 50 one or more additional times, or by running object 20 through a combination of coating system 50 (when electrophoretic) in conjunction with one or more non-electrophoretic coating systems either prior or subsequent to coating system 50. Accordingly, the description of the coating system 50 set forth above is merely illustrative of one method of employing the coating system 50, and is not intended to limit the scope of the present invention.

Figure 10A:
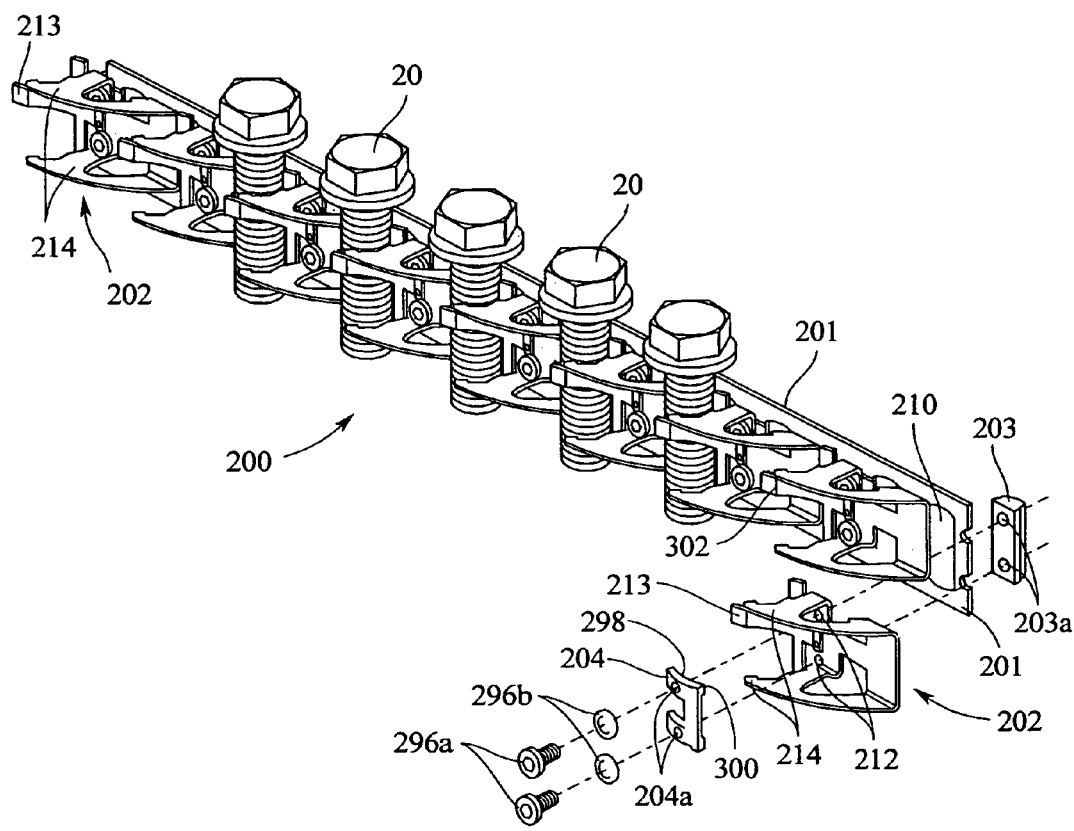
FIG. 10A is a perspective view, partially exploded, of another embodiment of the continuous belt of the present invention, releasably retaining an object in the form of a threaded bolt and washer.
Figure 10B:
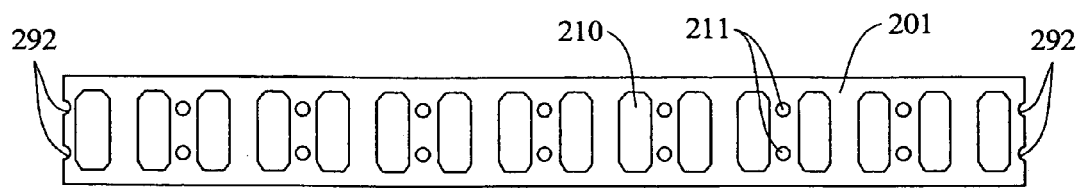
FIG. 10B is a top plan view of a belt segment of the apparatus shown in FIG. 1A.

FIGS. 10A through 15 show another embodiment, belt 200, of the present invention. FIGS. 10A and 10B illustrate the standard length belt segment 201. Belt segments 201 may be connected to each other to form a belt 290 (see FIG. 15) that, like belt strip 14 of belt 10, may be used by belt 200 to convey objects 20, such as bolts, from a point of origination to a destination point. Each segment 201 may be a band that may be constructed of stainless steel or another corrosion-resistant conductive material of uniform length, width, and thickness. As illustrated, belt segment 201 may define a series of 16 evenly spaced window openings 210. The windows 210 may serve one or more of the following purposes: 1) to maximize twist and bow flexibility of belt 290 to allow easier routing of belt 290 through the coating system; 2) to minimize the amount of surface of belt 290 to reduce the time needed to cool belt 290; 3) to allow fluid and air to pass through belt 290 to aid in coating, rinsing and cooling of objects 20 secured to belt 290; and 4) to provide a means for the teeth of the coating system's revolving drive cog to engage belt 290 and put in motion the continuous belt 200. On the solid surface between the windows 210 may be 7 sets of 2 evenly spaced clearance holes 211 that allow attachment of clip assemblies 202 to belt 290 with suitable fasteners. At each end of each belt segment 201 two holes 292 may be formed that may be semi-circular in shape and have an open end. Holes 292 allow two belt segments 201 to be joined together using a clip assembly 202, lug 203, belt joint 204, and two common pan head Phillips machine screws 296a with serrated washers 296b. Belt segments 201 may be joined together to create a belt 200 of a desired length and to eventually form a closed loop or continuous belt as needed by the coating system.

Referring again to FIG. 10A, belt apparatus 200 may include a clip assembly 202 that may be constructed of stainless steel or other corrosion-resistant conductive material. Clip assembly 202 may function to accept, retain, convey, and release objects 20, such as bolts, as required by the coating system. Clip assembly 202 defines clearance holes 212 that may be aligned with the clearance holes 211 on the belt segments 201. Clip assemblies 202 and belt segments 201 may be symmetrical designs and thus error-proof regarding being affixed to each other. Once the clip 202 is aligned with belt segment 201, a lug 203 having two threaded holes 203a may be aligned with the clearance holes 211 of belt segments 201 on the opposite side of where the clip 202 is resting on belt segment 201. A belt joint 204 with corresponding clearance holes 204a may be placed on the inside of clip 202 between the saddles 214 and aligned with clearance holes 212. Belt joint 204 may have four integral tabs 298 and 300 that protrude below the bottom surface of the joint 204 to create a recess in the body of joint 204. This recess permits the belt joint 204 to fit over clip 202 and the small strip metal between any two windows 210 to create a fit flush with the underside of the belt segment 201 and the bottom of lug 203. The belt segment 201, clip 202, lug 203, and belt joint 204 may be then fastened together using, for example, two common pan head Phillips machine screws 296a with serrated washers 296b inserted through the clearance holes 204a of belt joint 204, through clearance holes 212 and 211, and finally tightened into threaded holes 203a of lug 203. This procedure may be repeated to add clips 202 to the remainder of the belt segments 201, as well as to join adjacent belt segments 201 to each other.

Figure 15:
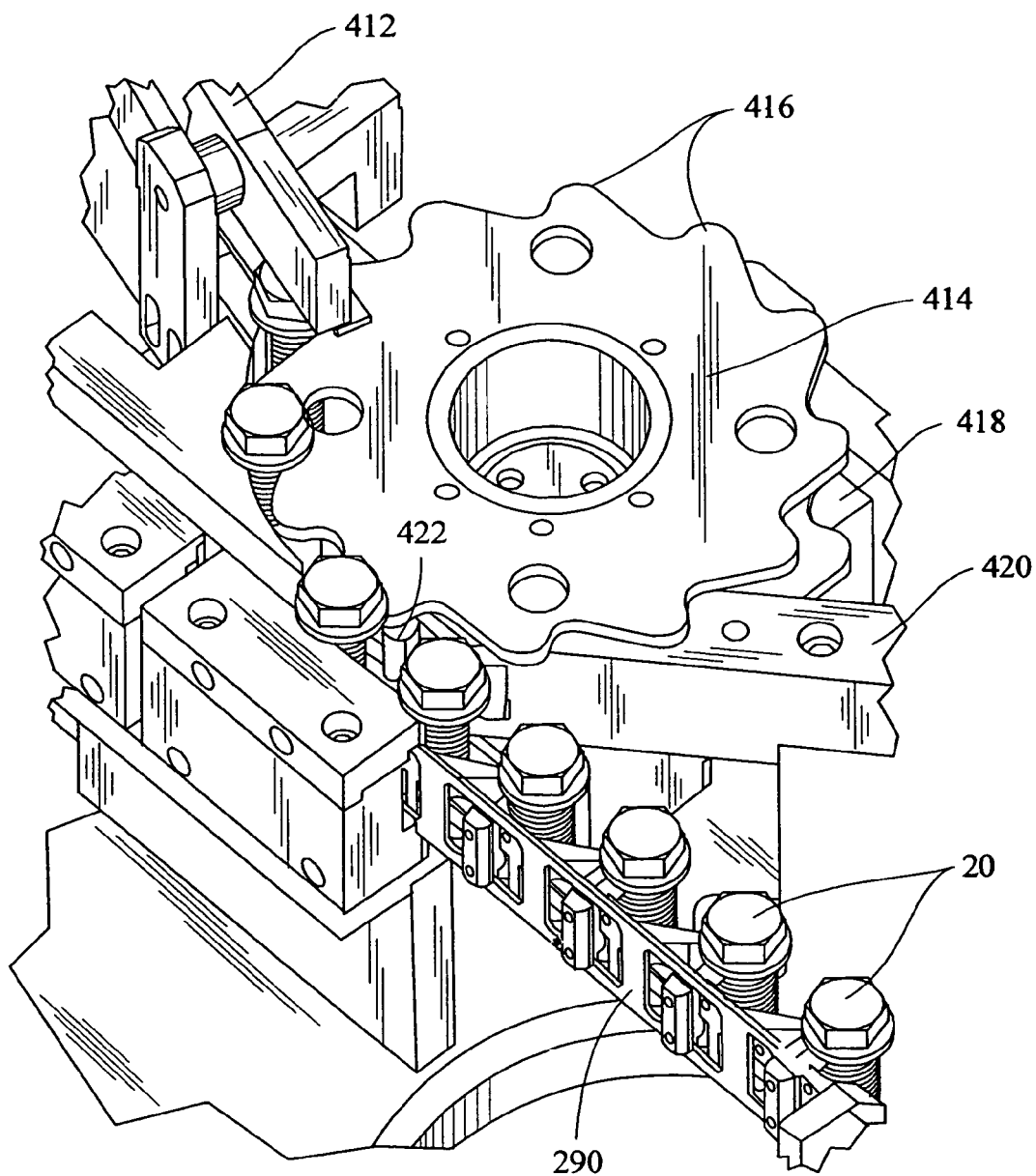
FIG. 15 is a perspective view of the feed system shown in FIG. 14.

Referring to FIG. 10A and FIG. 15, clip assembly 202 may include two vertical saddles or guide members 214 and a pre-loaded retaining member 213, that may be, itself, a retaining portion or an arm portion, which may act together as a retaining unit to retain the object 20 to belt segment 201. A powered or manually operated feed system, similar to one shown in FIG. 15 may be used to present, for example, bolts 20 to the belt assembly 200. As each bolt 20 contacts the pre-loaded retaining member 213, the force of bolt 20 causes retaining member 213 to open. That is, the retaining member 213 may be pushed downward toward the belt segment 201, which allows bolt 20 to enter the clip 202 and rest against the saddles 214. As the retaining member 213 returns to its pre-loaded state, its curved shape and upturned end 302 compliments that of the elongate portion of bolt 20 and provides sufficient force to retain bolt 20 against the saddles 214, to permit conveyance of bolt 20 through the coating system. The design of clip 202 minimizes the contact points on bolt 20 to allow for the maximum exposure of bolt 20 to optimize coating processes.

Figure 11A:
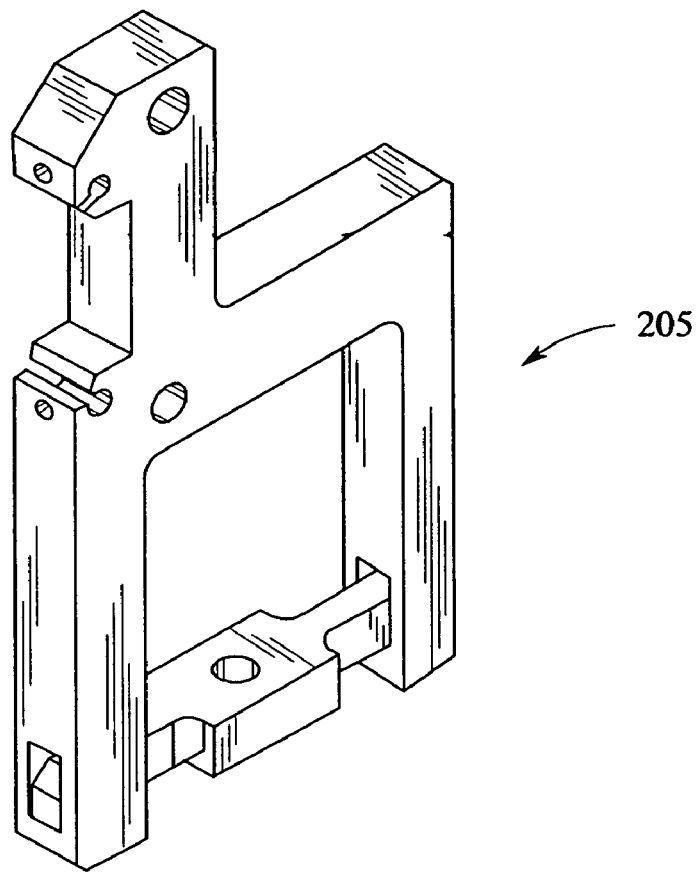
FIG. 11A is a perspective view of a clamp for the coating system.
Figure 11B:
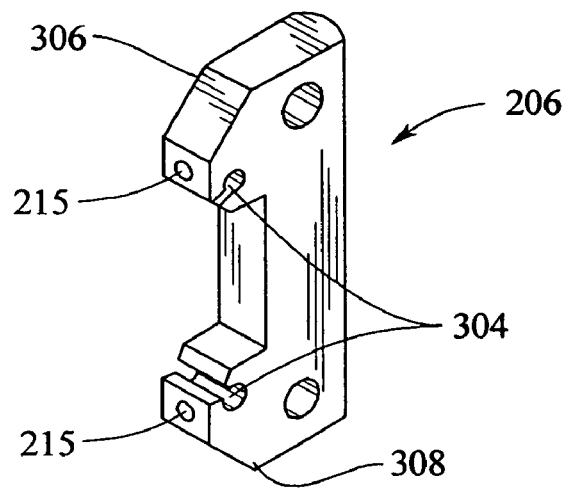
FIG. 11B is a perspective view of an alternate clamp for the coating system.
Figure 12A:
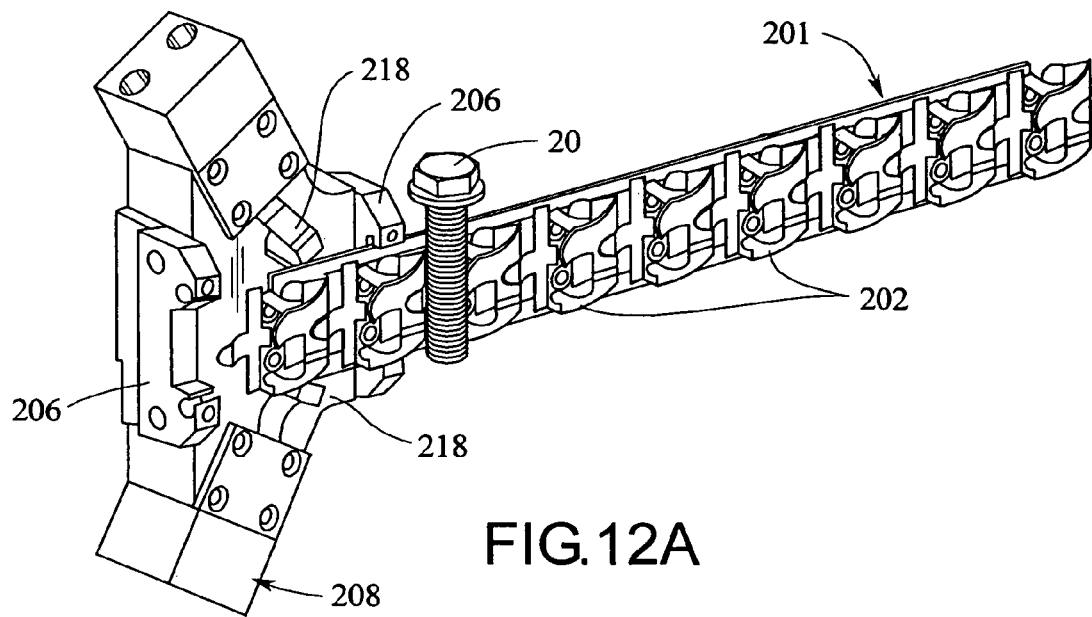
FIG. 12A is a perspective view of the scraper system for the belt apparatus provided by the present invention.
Figure 12B:
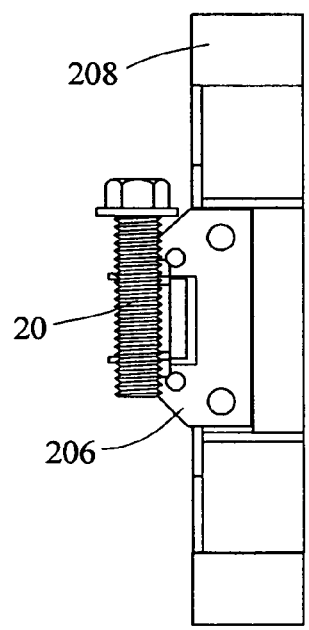
FIG. 12B is a side elevation view of the apparatus shown in FIG. 12A.

Referring to FIGS. 11A and 11B, to assist belt 200 in traveling through the coating system 50, any number of standard belt guides 206 or variations thereof may be employed along the pathway. Basic belt guide 206 can be used as presented in FIG. 11B or it can be used in conjunction with another assembly, or its design can be incorporated into another assembly to allow it to function with the coating system. Belt guide clamp 205 is one example of how the design of basic belt guide 206 can be incorporated into a new design. Belt guides are generally constructed from tool steel for purposes of durability and rigidity, but other materials may be used. Belt guide 206 is somewhat "C" shaped with recessed channels at the ends to accommodate the belt segments 201. Belt segments 201 travel through the guide 206 in a manner that the clips 202 are to the outside of guide 206 as shown in FIGS. 12A and 12B. Pins 215 may be installed in guide 206 to reduce drag and wear of the belt segments 201 as they travel through guide 206. Pins 215 may be made of carbide or wear resistant material that can withstand the friction of the edges of belt segments 201. The upper and lower ends 306 and 308 of guide 206 may be cut at an angle to allow unrestricted passage of objects being conveyed by belt apparatus 200, such as a typical ½ inch diameter, 4 inch long, hex head bolt with course threads and a captive washer shown in FIGS. 12A and 12B.

Referring to FIGS. 12A and 12B, belt apparatus 200 may include a scraper assembly 208, which may be made of tool steel. Scraper assembly 208 may employ two scrapers 218 that continuously contact the edge of each belt segment 201 as it travels through the coating system 50. Ground leads may be attached directly to the scrapers 218 to ensure a continuous electrical ground as the scrapers 216 remove any foreign material from the belt segments 201 that accumulates as a result of a coating process. Belt guides 206 may be affixed to stripper assembly 208 to ensure the belt segments 201 do not dislodge or buckle under the pressure exerted on it by the scraper 218.

Figure 13A:
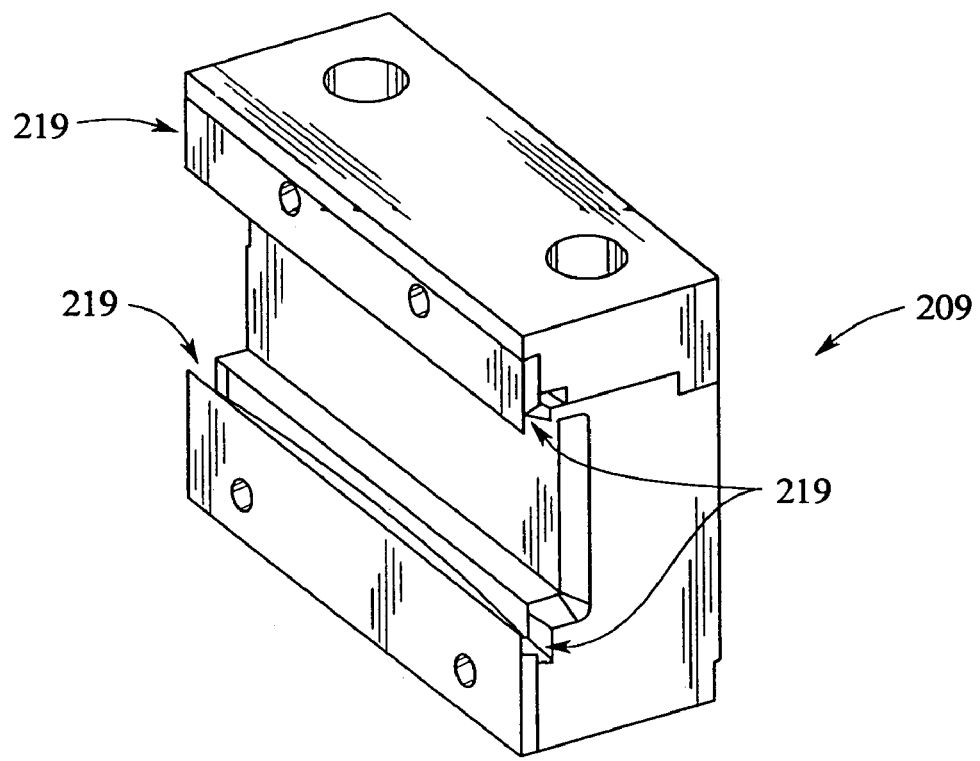
FIG. 13A is a perspective view of a deflector for removing objects conveyed by the belt apparatus provided by the present invention.
Figure 13B:
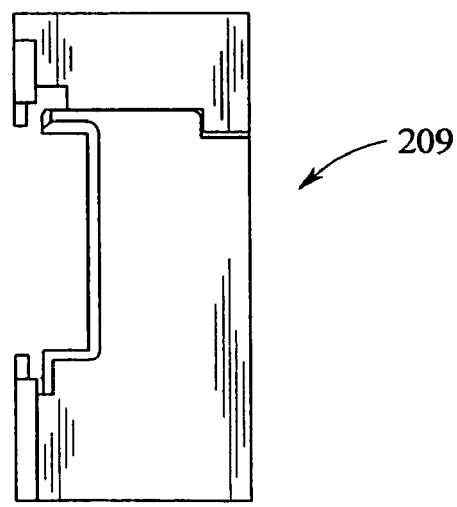
FIG. 13B is a side elevation view of the deflector shown in FIG. 13A.

Referring now to FIGS. 13A and 13B, deflector guide 209 acts to capture the cross member piece of the retaining member 213 by use of a low angle lead-in 219, which results in releasing the force against a object 20 to allow it to disengage from the saddles 214 and drop from the belt apparatus 200 and into a completed parts bin or other collection device.

Figure 14:
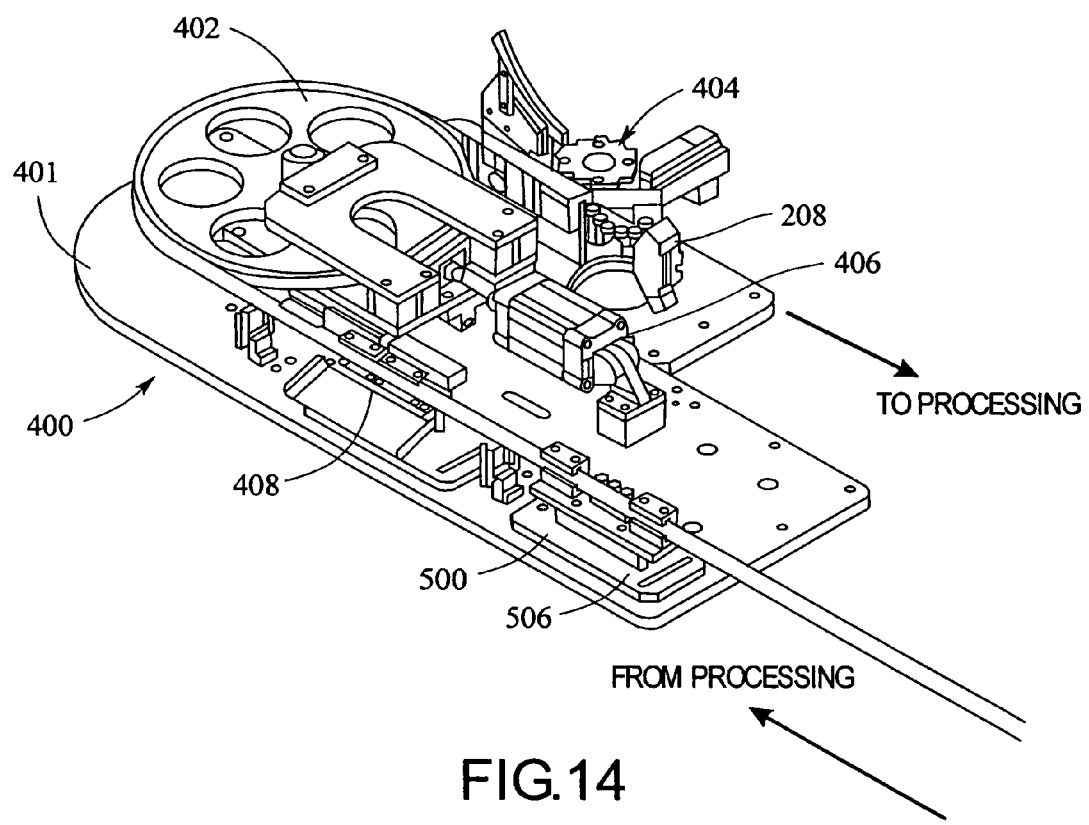
FIG. 14 is a perspective view of a drive system and feed system for the belt apparatus provided by the present invention.
Figure 16:
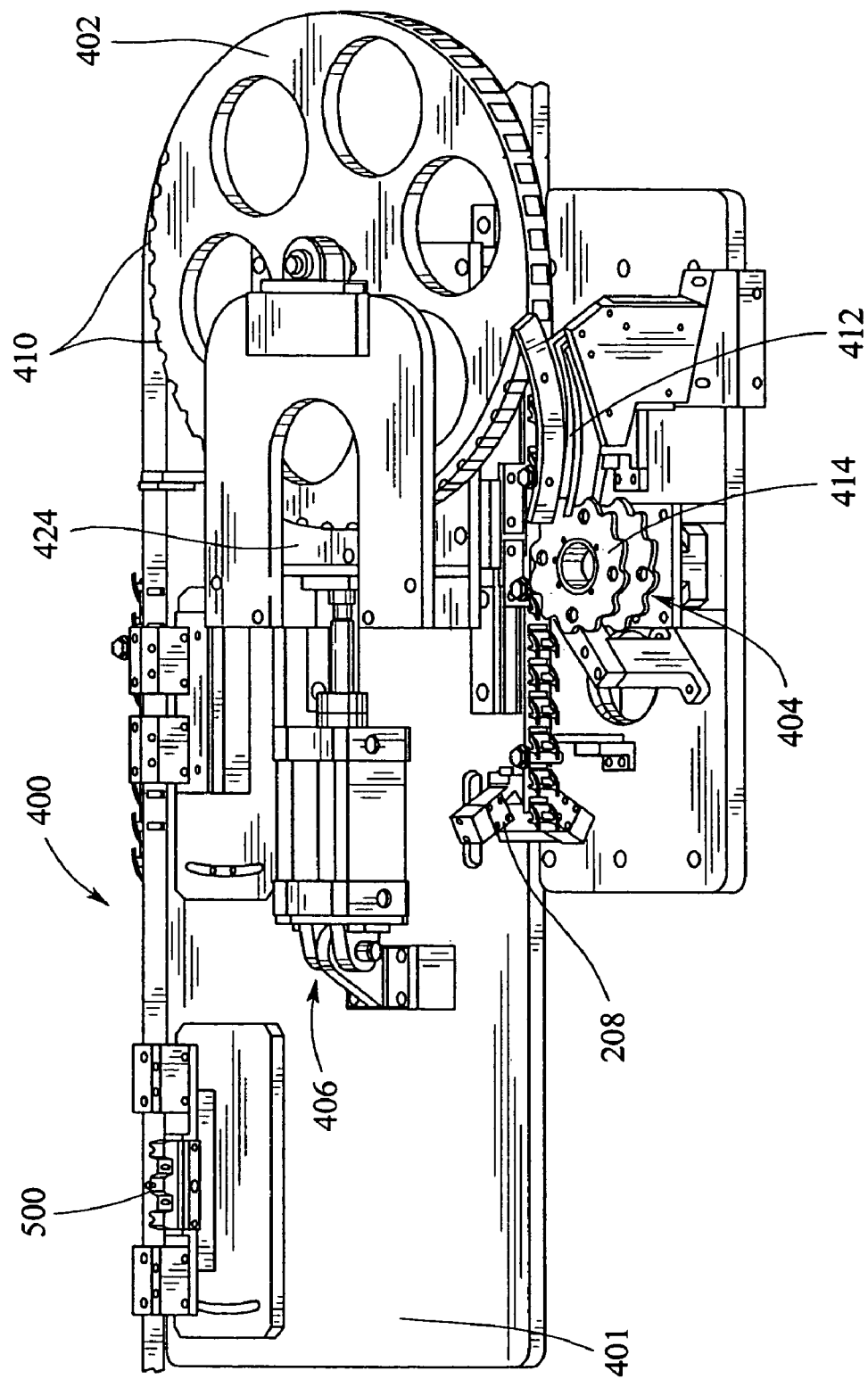
FIGS. 16 and 17 are perspective views of the drive system and feed system.
Figure 17:
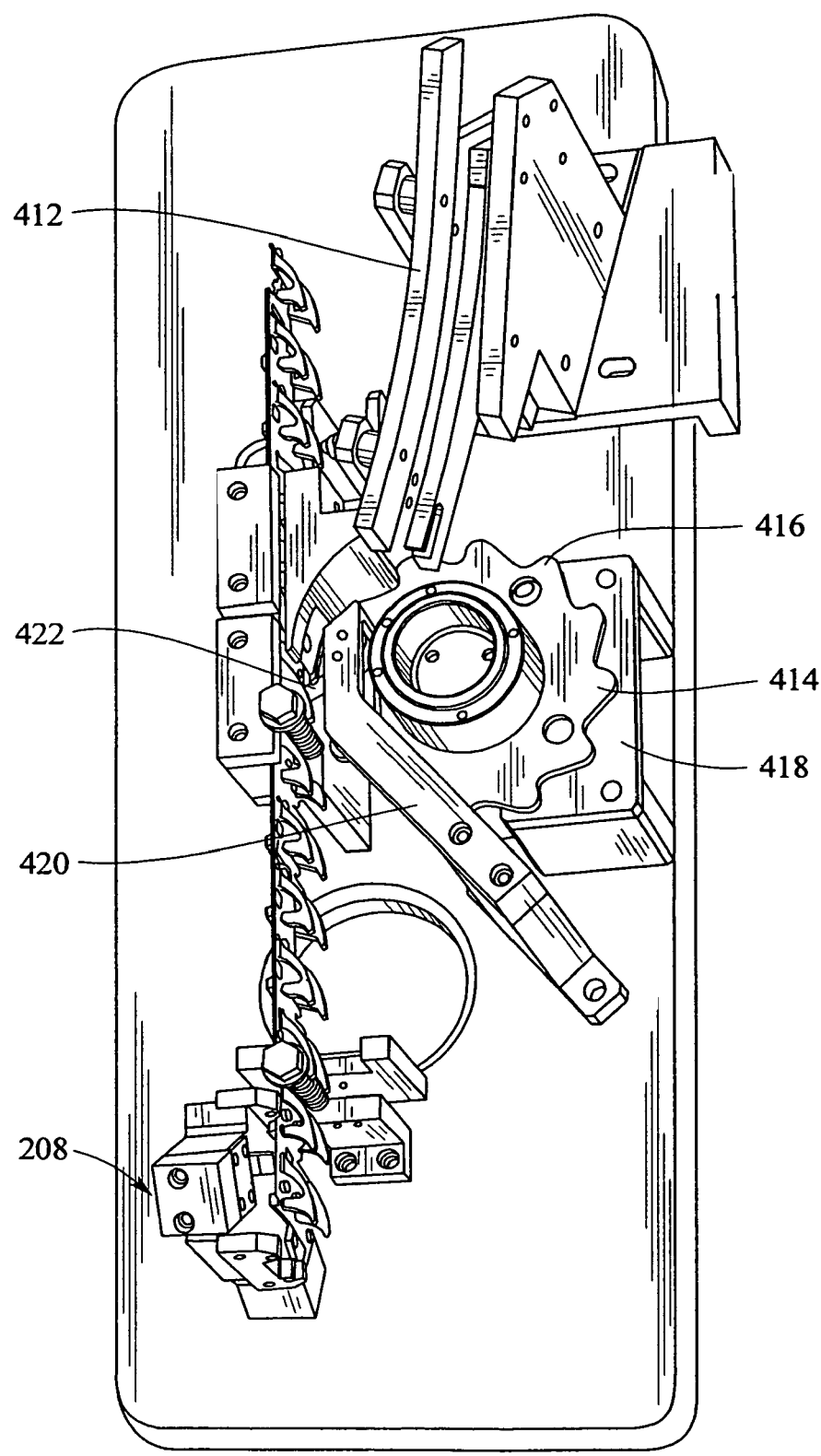
Figure 18:
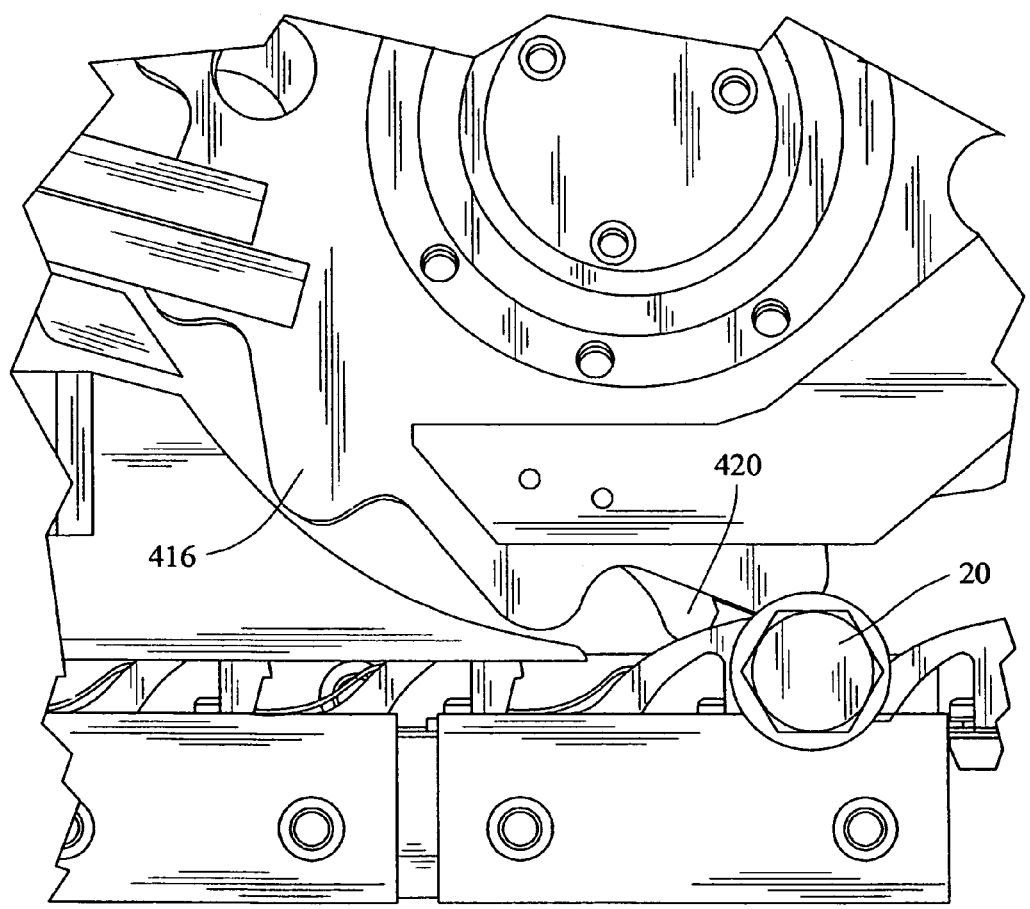
FIG. 18 is a top plan view of part of the feed system.
Figure 19:
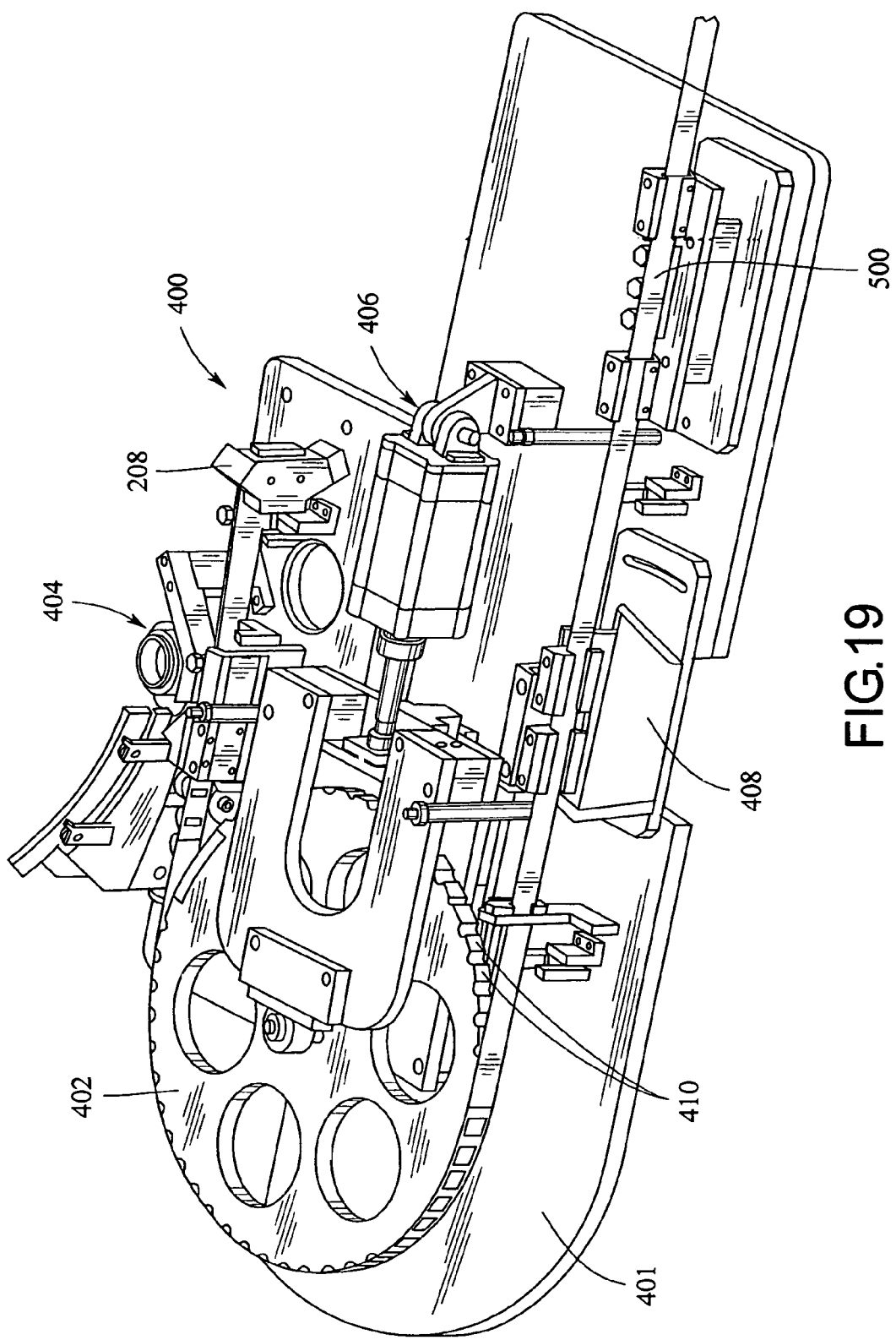
FIG. 19 is a perspective view of the belt apparatus shown in FIG. 10A, the drive system, the feed system, the scraper station and the deflector station.
Figure 20:
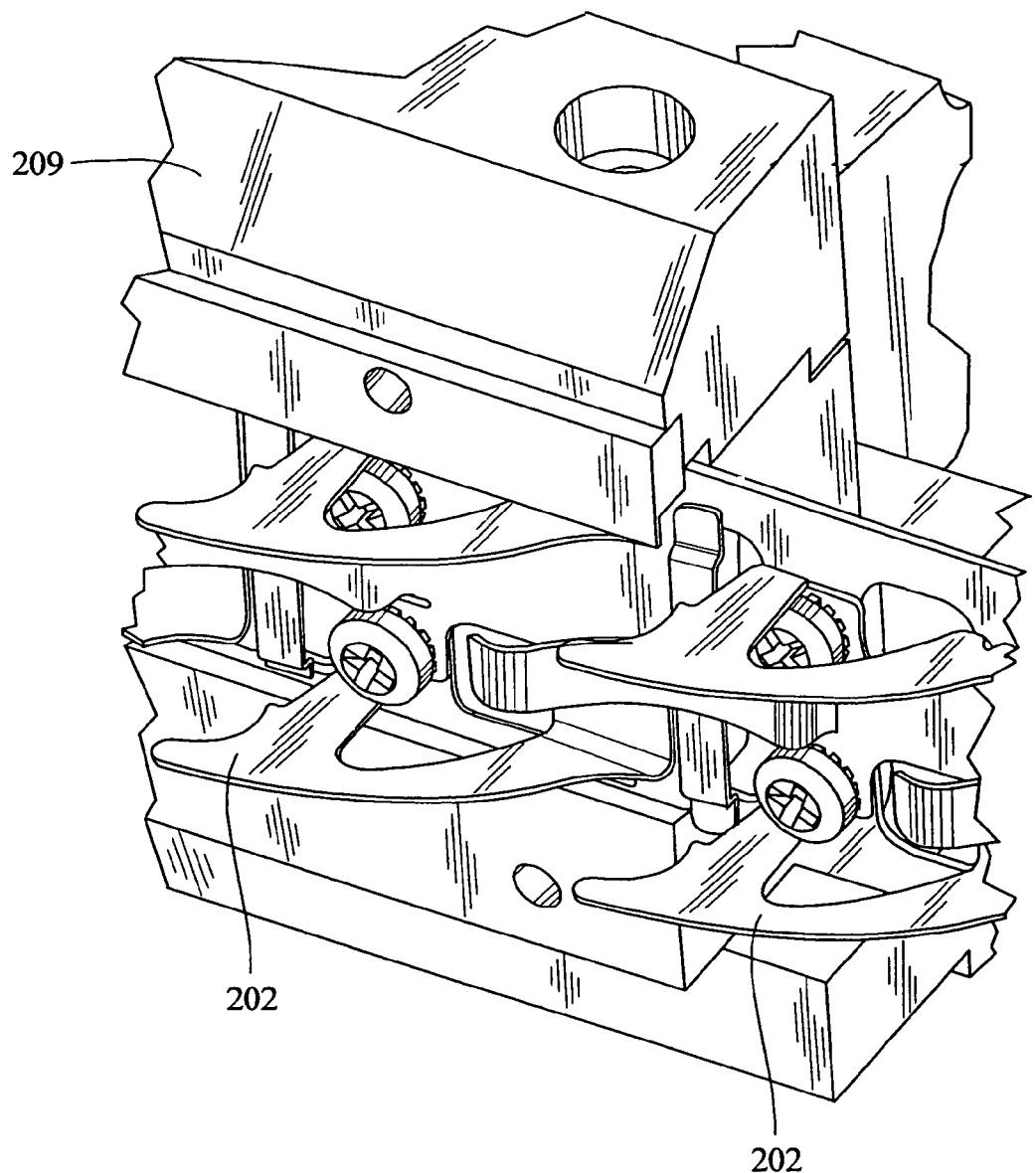
FIG. 20 is a perspective view of part of the deflector station.
Figure 21:
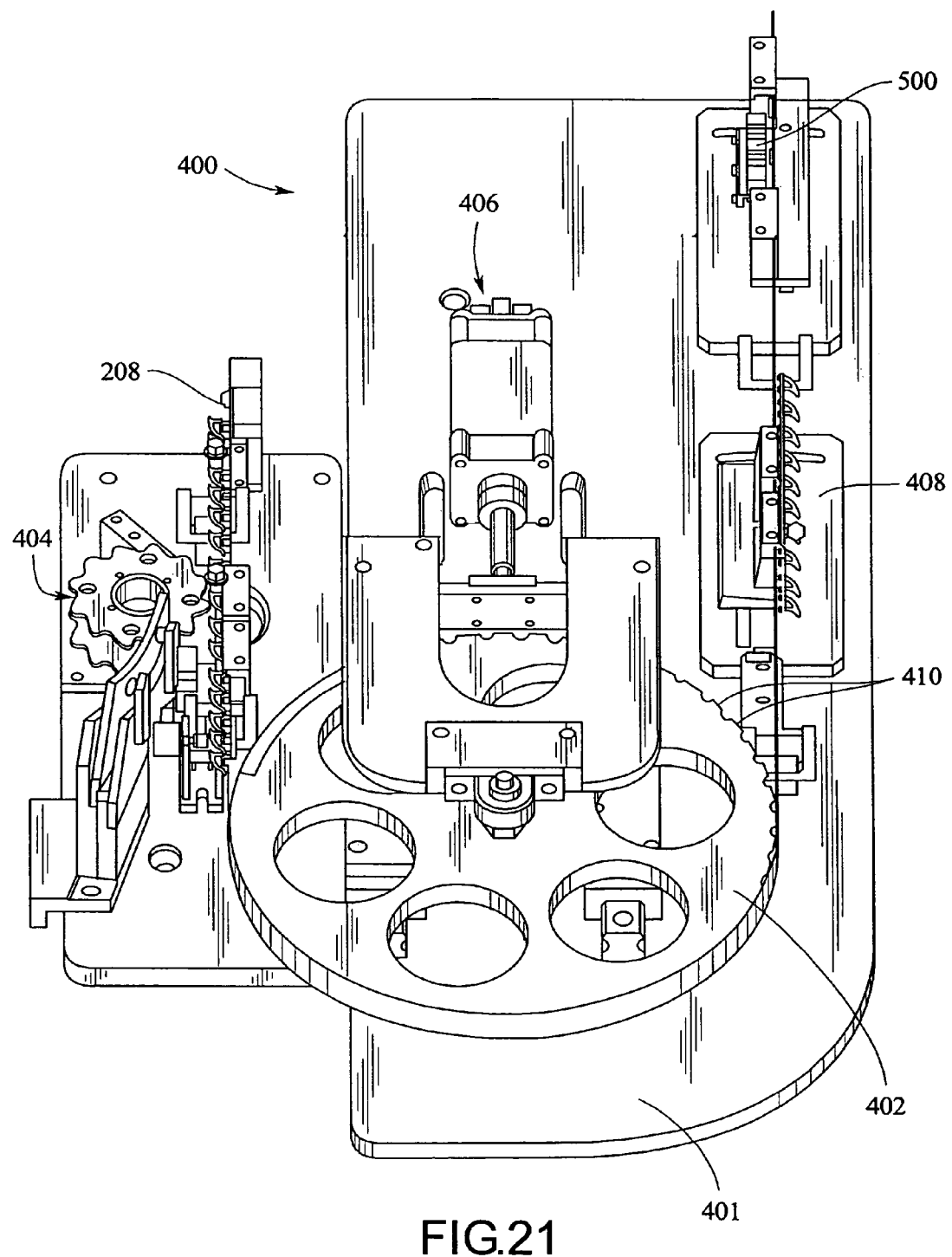
FIG. 21 is a perspective view of the belt apparatus shown in FIG. 10A, the drive system, the feed system, the scraper station and the deflector station.

FIGS. 14 and 16 show a drive system 400 that can be used to control the motion of either belt apparatus 10 or belt apparatus 200. In the Figures, however, drive system 400 is described as driving belt apparatus 200. Broadly, drive system 400 may include a support 401, a drive wheel 402, a bolt feed system 404, a belt tensioning system 406, and a deflector station 408.

Drive wheel 402 may be mounted on a suitable support 424 on support 401 for both limited translation, and for rotation with respect to support 401. Wheel 402 may be rotated by any suitable motor. The ability of wheel 402 to translate allows for adjustment of the tension on belt apparatus 200, and for detection of belt breaks and jams. Teeth 410 defined by drive wheel 402 engage windows 210 of belt segments 201 to provide motion to belt apparatus 200 and the bolts 20 releasably secured thereto.

Referring to FIGS. 14, 15, 16 and 17, feed system 404 feeds objects 20, such as bolts 20, to belt 200 along a feed ramp 412 that is mounted on support 401 and itself fed with objects 20 in any suitable known fashion. Objects 20 may be guided from ramp 412 into clip assemblies 202 by teeth 416 of a rotating guide wheel 414 that may be mounted for rotation using a suitable support 418 that may be mounted to support 401 in any suitable fashion, and by a guide 420 that may also be mounted to support 401. A spring-loaded pivoting tongue 422 may be mounted to support 420, and may assist to push objects 20 into retaining member 213 as the bolts are fed into clip assemblies 202.

Belt tensioning system 406 can be any suitable belt tensioner known in the art. Preferably, the belt tensioner 406 is a pneumatically operated system manufactured by Festo AG & Co. of Germany. Belt tensioner 406 may adjust the position of drive wheel 402 to provide for better operation by exerting a controlled force by a pneumatic cylinder against the translatable support 424 for wheel 402. Belt tensioner 406 also detects belt breaks and jams. If a belt jam occurs, the belt tends to cause support 424 and wheel 402 to translate against the pneumatic cylinder of tensioner 406 toward tensioner 406. If a belt break occurs, the pneumatic cylinder of tensioner 406 is able to push support 424 and wheel 402 away from tensioner 406. In either case, sensors may be provided to detect the abnormal movement of wheel 402 or support 424 and cease operation of the coating system and the drive system 400.

Referring to FIGS. 13A, 13B, 14, 19, 20 and 21, deflector station 408 may be mounted to support 401 to remove objects 20 from retaining member assemblies 202. As is described above, objects 20 may be pushed from retaining member assemblies 202 by ramps 219 of deflectors 209 as belt segments 201 pass through deflectors 209.

Figure 22:
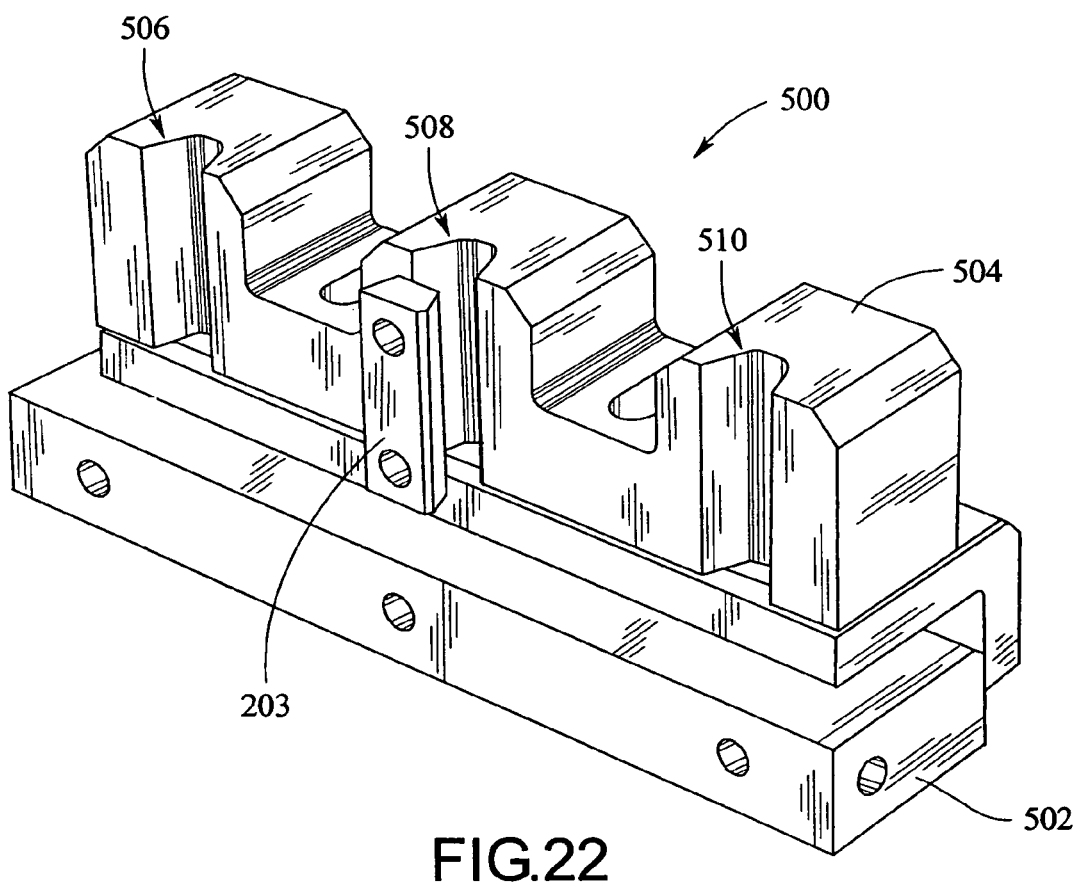
FIG. 22 is a perspective view of the splice unit shown in FIG. 14.

If desired, system 400 can include the splice unit 500 shown in FIG. 22. Splice unit 500 may be used to align replacement clips 202 on a belt segment 201, and to join to each other two belt segments 201 using a clip 202. Splice unit 500 may include a base 502 and an indexer 504. A plate 506 may be mounted to support 401, and base 502 may be mounted to plate 506. Indexer 504 may be spring mounted to base 502 in any suitable fashion for limited horizontal movement with respect to base 502. Preferably, posts (not shown) are defined on the rear surface of base 502 around which or within which springs may be mounted that bias indexer 504 away from base 502. Accordingly, indexer 504 can be moved toward a confronting belt segment 201 against the force of the springs, and then locked in place using any suitable arrangement. For example, a set screw (not shown) can be provided through the rear surface of splice unit 500 which, when rotated, locks indexer 504 in place. Indexer 504 may define three lug registrations 506, 508 and 510, each of which is shaped to receive a lug 203. Registrations 506 and 510 are used to receive lugs 203 that are already mounted in place on a belt segment 201. Registration 508 may be used to receive a lug 203 that will be mounted on a segment 201 (if a clip 202 is being replaced on segment 201) or a pair of adjacent segments 201 (if a clip 202 is being used to join two segments 201) to mount a clip 202 to one segment or a pair of adjacent segments 201. Thus, inserting a mounted lug or mounted lugs 203 in registrations 506 and/or 510 ensures that a lug 203 inserted into registration 508 will be aligned properly, and ensuring that the corresponding clip 202 has been mounted in the proper location.

The present invention allows areas, such as the Class A surfaces of objects to be coated at high speeds through various coating processes, while reducing the risk that those coated surfaces will be marred, by releasably retaining those objects in a fixed position at one or more points on the non-Class A surfaces on the object. As a result, the deposited coating on the Class A surface is more uniform and includes less defects than previous prior art coating techniques.

Whereas particular embodiments of this invention have been described above for purposes of illustration, it will be evident to those skilled in the art the numerous variations of the details of the present invention may be made without departing from the invention as defined in the appended claims.

What is claimed is:

1. A method for the electrophoretic application of a polymeric coating to an object having an elongate portion defining an elongate axis on a continuous belt, comprising: positioning the object between a retaining member and a guide member engaging the continuous belt, such that the object is releasably retained therebetween, the retaining member engaging the continuous belt such that a retaining portion on the retaining member is biased toward the belt and configured to releasably retain the elongate portion in a fixed and transverse position with respect to the elongate axis on a non-Class A surface of the object to the belt;

conveying the continuous belt with a drive mechanism; and electrophoretically coating the object on the continuous belt.

2. The method of claim 1, wherein the positioning step further includes positioning the object against a sloping portion of the guide member, each guide member including the sloping portion having a decreasing height as measured from its base, and having its greatest height nearest the respective retaining member.

3. The method of claim 1, wherein the positioning further includes positioning the elongate portion of the object in a saddle portion of at least one of the guide members and the retaining member.

4. The method of claim 1, further comprising releasing the object from the retaining member following the coating step.

5. The method of claim 1, wherein the positioning step further includes positioning a plurality of objects to engage a plurality of guide members and retaining members, each retaining member being positioned relative to each respective guide member to form a plurality of retaining units positioned along the belt, each respective retaining unit being positioned to releasably retain a respective object.

6. The method of claim 5, further comprising positioning the object to be releasably retained in the same lateral direction.

7. The method of claim 6, wherein each retaining unit is positioned to releasably retain a cylindrical elongate portion of the object.

8. The method of claim 7, wherein each retaining unit is positioned to releasably retain at least a portion of a shaft portion of a bolt.

9. The method of claim 8, wherein each retaining unit is positioned to releasably retain at least a portion of a threaded portion of the shaft portion.

10. The method of claim 1, wherein the positioning further includes positioning the object against a sloping portion of the guide member, the sloping portion having a decreasing height as measured from a base of the guide member.

11. The method of claim 10, wherein the guide member has its greatest height nearest the retaining member.

12. The method of claim 10, wherein the guide member includes a saddle portion that is shaped to conform to an outer surface of the elongate portion of the object.

13. The method of claim 1, wherein the positioning further includes positioning an arm portion of the retaining portion to releasably retain the object between the retaining member and the guide member.

14. The method of claim 13, wherein the arm portion is a flexible metal member.

15. The method of claim 14, further comprising adjusting the arm portion to releasably retain the object between the retaining member and the guide member.

16. The method of claim 13, wherein the arm portion includes a saddle portion having a shape that conforms to an outer surface of the elongate portion of the object.

17. The method of claim 1, further comprising adjusting the retaining member to releasably retain the object.

18. The method of claim 1, further comprising establishing electrical contact with at least one electrical grounding member positioned on the continuous belt.

19. The method of claim 18, wherein electrical contact is made with a plurality of grounding members spaced on the belt.

20. The method of claim 1, further comprising feeding the object onto the continuous belt by a feeding mechanism.

21. The method of claim 20, wherein the feeding mechanism includes a hopper for receiving objects to be fed.

22. The method of claim 21, wherein the feeding mechanism includes a sorter in operative engagement with the feeding mechanism.

23. The method of claim 21, wherein the feeding mechanism is selected from of a bolt feeding mechanism, a nut feeding mechanism, and a washer feeding mechanism.

24. The method of claim 23, wherein the feeding mechanism comprises a bolt feeding mechanism.

25. The method of claim 1, further comprising pretreating the objects prior to the positioning step.

26. The method of claim 1, further comprising drying the objects following the coating step.

27. The method of claim 1, further comprising curing the coating on the object following the coating step.

28. A method for the electrophoretic application of a polymeric coating to an object having an elongate portion defining an elongate axis on a continuous belt, comprising:
    feeding the object onto the continuous belt by a feeding mechanism;
    positioning the object between a retaining member and a guide member engaging the continuous belt, such that the object is releasably retained therebetween and such that the force of the object contacting a flexible retaining portion on the retaining member causes the retaining portion to lift from one of a closed or partially closed position to an open position for receipt of the object, the retaining member engaging the continuous belt such that the retaining portion on the retaining member is biased toward the belt and configured to releasably retain the elongate portion in a fixed and transverse position with respect to the elongate axis on a non-Class A surface of the object to the belt;
    conveying the continuous belt with a drive mechanism;
    electrophoretically coating the object on the continuous belt;
    drying the coating on the object; and
    releasing the object from the retaining member.

29. The method of claim 28, wherein the positioning step further includes positioning an arm portion of the retaining portion to releasably retain the object between the retaining member and the guide member.

30. The method of claim 29, wherein the positioning step further includes positioning the object against a sloping portion of the guide member, the guide member including a sloping portion having a decreasing height as measured from its base, and having its greatest height nearest the respective retaining member.

31. The method of claim 29, wherein the positioning step further includes positioning the elongate portion of the object in a saddle portion of at least one of the guide members and the retaining portion.

32. The method of claim 29, wherein the positioning step further includes positioning a plurality of objects to engage a plurality of guide members and retaining members, each retaining member being positioned relative to each respective guide member to form a plurality of retaining units positioned along the belt, each respective retaining unit being positioned to releasably retain a respective object.

33. The method of claim 29, further comprising positioning the objects to be releasably retained in the same lateral direction.

34. The method of claim 33, wherein each retaining unit is positioned to releasably retain a cylindrical elongate portion of the object.

35. The method of claim 28, further comprising establishing electrical contact with at least one electrical grounding member positioned on the continuous belt.

36. The method of claim 35, wherein electrical contact is made with a plurality of grounding members spaced on the belt.

37. The method of claim 28, wherein the coating is cured on the objects by heating the coated objects after the coating.

38. A method for the electrophoretic application of a polymeric coating to an object having an elongate portion defining an elongate axis on a continuous belt, comprising:
    feeding the object onto the continuous belt by a feeding mechanism;
    positioning the elongate portion of the object between a retaining member and a guide member engaging the continuous belt such that the force of the object contacting a flexible retaining portion on the retaining member causes the retaining portion to lift from one of a closed or partially closed position to an open position for receipt of the object, such that the object is releasably retained therebetween, the retaining member and the guide member positioned to form a retaining unit on the belt, the guide member having a base portion that engages the continuous belt and including a sloping portion having a decreasing height as measured from its base, the retaining member having an arm portion that is biased toward the belt and configured to releasably retain the elongate portion in a fixed and transverse position with respect to the elongate axis on a non-Class A surface of the object between the guide member and the retaining member;
    conveying the continuous belt with a drive mechanism;
    electrophoretically coating the object on the continuous belt;
    drying the object on the continuous belt; and
    releasing the object from the retaining unit.

39. The method of claim 38, wherein the guide member comprises at least two wedge-shaped sloping portions.

40. The method of claim 39, wherein the sloping portions have a thickness that is less than the distance between two individual threads on the elongate portion.

* * * * *